United States Patent
Fernández Carneado et al.

(10) Patent No.: US 12,544,431 B2
(45) Date of Patent: Feb. 10, 2026

(54) PEPTIDES FOR THE TREATMENT OF CANCER AND/OR METASTASIS

(71) Applicant: BCN PEPTIDES, S.A., Sant Quinti de Mediona (ES)

(72) Inventors: Jimena Fernández Carneado, Villaviciosa (ES); Berta Ponsati, Barcelona (ES); Antonio Parente Dueña, Esplugues de Llobregat (ES); Mariona Vallés-Miret, Vilafranca del Penedès (ES); Josep Farrera-Sinfreu, Sitges (ES); Anna Almazán-Moga, Vic (ES); Josep Roma Castanyer, L'esquirol (ES); Soledad Gallego Melcón, Barcelona (ES); José Sánchez De Toledo Codina, Barcelona (ES); Lucas Moreno Martín-Retortillo, Sant Cugat del Vallès (ES); Natalia Navarro Barea, Sabadell (ES); Carla Molist Muñoz, Sant Julià de Vilatorta (ES)

(73) Assignee: BCN PEPTIDES, S.A., Sant Quinti de Mediona (ES)

( * ) Notice: Subject to any disclaimer, the term of this patent is extended or adjusted under 35 U.S.C. 154(b) by 846 days.

(21) Appl. No.: 17/781,947

(22) PCT Filed: Nov. 30, 2020

(86) PCT No.: PCT/EP2020/083987
§ 371 (c)(1),
(2) Date: Jun. 2, 2022

(87) PCT Pub. No.: WO2021/110609
PCT Pub. Date: Jun. 10, 2021

(65) Prior Publication Data
US 2024/0238390 A1    Jul. 18, 2024

(30) Foreign Application Priority Data

Dec. 5, 2019 (EP) .................................. 19383084

(51) Int. Cl.
*A61K 38/48* (2006.01)
*A61P 35/00* (2006.01)
*C12N 9/64* (2006.01)

(52) U.S. Cl.
CPC .......... *A61K 38/4886* (2013.01); *A61P 35/00* (2018.01); *C12N 9/6489* (2013.01); *C12Y 304/24* (2013.01)

(58) Field of Classification Search
CPC ..... A61K 38/4886; A61K 38/00; A61P 35/00; C12N 9/6489; C12Y 304/24; C07K 14/705

See application file for complete search history.

(56) References Cited

FOREIGN PATENT DOCUMENTS

| GB | 2453589 A | 4/2009 |
| WO | WO-2006014903 A2 | 2/2006 |
| WO | WO-2011100362 A1 | 8/2011 |
| WO | WO-2015028027 A1 * | 3/2015 ........... C12Q 1/6886 |
| WO | WO-2015040089 A1 | 3/2015 |

OTHER PUBLICATIONS

Sawai et al., Impact of single-residue mutations on the structure and function of ovispirin/novispirin antimicrobial peptides, Protein Engineering, Design and Selection, vol. 15, Issue 3, Mar. 2002, pp. 225-232, https://doi.org/10.1093/protein/15.3.225 (Year: 2002).*
Single Point Mutations Induce a Switch in the Molecular Mechanism of the Aggregation of the Alzheimer's Disease Associated Aβ42 Peptide Bolognesi et al. ACS Chemical Biology 2014 9 (2), 378-382 DOI: 10.1021/cb400616y (Year: 2014).*
Shao et al. (2014) ADAM-12 as a Diagnostic Marker for the Proliferation, Migration and Invasion in Patients with Small Cell Lung Cancer. PLOS ONE 9(1): e85936. https://doi.org/10.1371/journal.pone.0085936 (Year: 2014).*
Camilla Fröhlich, Reidar Albrechtsen, Lars Dyrskjøt, Lise Rudkjær, Torben F. Ørntoft, Ulla M. Wewer; Molecular Profiling of ADAM 12 in Human Bladder Cancer. Clin Cancer Res Dec. 15, 2006; 12 (24): 7359-7368 (Year: 2006).*
K. Eto: "RGD-independent Binding of Integrin alpha 9beta 1 to the ADAM-12 and -15 Disintegrin Domains Mediates Cell-Cell Interaction", Journal of Biological Chemistry, vol. 275, No. 45, Nov. 3, 2000 (Nov. 3, 2000), pp. 34922-34930, XP055028844, ISSN: 0021-9258, DOI:10.1074/jbc.M001953200; the whole document.
Nyren-Erickson Erin K et al: "A disintegrin and metalloproteinase-12 (ADAM12): Function, roles in disease progression, and clinical implications", Biochimica Et Biophysica Acta (BBA)—General Subjects, Elsevier, Amsterdam, NL, vol. 1830, No. 10, May 13, 2013 (May 13, 2013), pp. 4445-4455, XP028689366, ISSN: 0304-4165, DOI:10.1016/J.BBAGEN.2013.05.011; the whole document.
International Search Report and Written Opinion of the International Search Authority, issued in PCT/EP2020/083987, mailed Feb. 17, 2021; ISA/EP.
Reymond et al. Nature Reviews 2016, 13(12), 858-70.
Duffy et al. Clin Chim Acta 2009, 403(1-2), 31-6.
Mochizuki et al. Cancer Sci 2007, 98(5):621-8.
Zadka et al. Neoplasma 2018, 65(6), 823-39.
Yagami-Hiromasa et al. Nature 1995, 377(6550), 652-6.
Gilpin et al. J Biol Chem 1998, 73(1), 157-66.
Nyren-Erickson et al. Biochim Biophys Acta 2013, 1830(10), 4445-55.

(Continued)

*Primary Examiner* — Jeanette M Lieb
*Assistant Examiner* — David Paul Bowles
(74) *Attorney, Agent, or Firm* — Harness, Dickey & Pierce, P.L.C.

(57) ABSTRACT

The present invention belongs to the field of biomedical chemistry and provides modified peptides and dimers thereof derived from the amino acid sequence of the protein ADAM-12, their compositions, process of synthesis and their use in medicine, specifically in the inhibition of cancer growth and/or the reduction or inhibition of cancer cell invasion and metastasis in different cancers.

17 Claims, 3 Drawing Sheets
Specification includes a Sequence Listing.

(56) References Cited

OTHER PUBLICATIONS

Kveiborg et al. J Biochem Cell Biol 2008, 40(9), 1685-702.
Thodeti et al. J Biol Chem 2003, 278(11), 9576-84.
Iba et al. Am J Pathol 1999, 154(5), 1489-501.
Huang et al. Oncogene 2018, 37(49), 6316-26.
Kveiborg et al. Cancer Res 2005, 65(11), 4754-61.
Ma et al. Int J Clin Exp Pathol 2015, 8(10), 13279-83.
Roy et al. J Biol Chem 2004, 279(49), 51323-30.
Cheon et al. Carcinogenesis 2015, 36(7), 739-47.
Peduto et al. Oncogene 2006, 25(39), 5462-6.
Kodama et al. Am. J Pathol 2004, 165(5), 1743-53.
Carl-McGrath et al. Int J Oncol 2005, 26(1), 17-24.
Shimura et al. Cancer Prev Research 2015, 8(3), 240-8.
Veenstra et al. Oncogenesis 2018, 7(11), 87.
Frölich et al. Clin Cancer Research 2006, 12(24), 7359-68.
Mazzocca et al. Biochim Biophys Acta 2010, 1806(1), 74-81.
Le Pabic, Hepatology 2003, 37(5), 1056-66.
Shao et al. Plos One 2014, 9(1), e85936.
Tian et al. J Clin Pathol 2002, 55(6), 394-7.
George et al. Eur J Cancer 2013, 49(9), 2253-63.
Cireap et al. Pathol Oncol Res 2013, 19(4), 755-62.
Dyczynska et al. Int J Cancer 2008, 122(11), 2634-40.
Li et al. Breast Cancer Res Treat 2012, 135(3), 759-69.
Li et al. Breast Cancer Res Treat 2013, 139(3), 691-703.
Høye et al. Adv Biol Regul 2012, 52(2), 326-39.
Allen et al. J Pathol 2011, 223(5), 646-58.
Wang et al. Int J Cancer 2019, 145(10), 2767-80.
Majumder et al. Plos One 2012, 7(4), e35094.
Ota et al. J Mol Med 2014, 92(12), 1271-81.
Lydolph et al. Exp Cell Research 2009, 315(19), 3312-24.
Lu et al. Cardiovasc Hematol Agents Med Chem 2007, 5(1), 29-42.
Masià et al. Br J Cancer 2012, 107(8), 1374-83.
Berge et al. J Pharm Sci 1977, 66(1), 1?19.
Stewart J.M. and Young J.D., 1984, "Solid Phase Peptide Synthesis, 2nd edition" Pierce Chemical Company, Rockford, Illinois.
Bodanszky M., and Bodanszky A., 1984 "The practice of Peptide Synthesis" Springer Verlag, Berlin.
Lloyd-Williams P., Albericio F. and Giralt E. (1997) "Chemical Approaches to the Synthesis of Peptides and Proteins" CRC, Boca Raton, FL, USA.
Kullmann, J Biol Chem 1980, 255(17), 8234?8238.
Lloyd-Williams P. et al. Tetrahedron 1993, 49(48), 11065?11133.
Smith M. B. and March J., 1999 "March's Advanced Organic Chemistry Reactions, Mechanisms and Structure", 5th Edition, John Wiley & Sons, 2001.
Greene T.W. and Wuts P.G.M., (1999) "Protective groups in organic synthesis" John Wiley & Sons, New York.
Atherton B. and Sheppard R.C. (1989) "Solid Phase Peptide Synthesis: A practical approach" IRL Oxford University Press.
Matsueda et al. Peptides 1981, 2(1), 45?50.
Barlos et al. Tetrahedron Lett 1989, 30, 3943?3946.
Barlos K. et al. Tetrahedron Lett. 1989, 30, 3947?3951.
Albericio et al. J Org Chem 1990, 55(3), 3730?3743.
Rink 1987, Tetrahedron Lett 28(33), 3787?90.
Wang, J Am Chem Soc 1973, 95(4), 1328?33.
Rowe R.C., Sheskey P.J., Quinn, M.E. (2009) "Handbook of Pharmaceutical Excipients, 6th Edition", Pharmaceutical Press and American Pharmacists Association.
Reymond et al. Nature Reviews Cancer 2013, 13(12), 858-70.
Kveiborg et al. Int J Biochem Cell Biol 2008, 40(9), 1685-702.
Georges et al. Eur J Cancer 2013, 49(9), 2253-63.

\* cited by examiner

SEQUENCE LISTING

```
<160> NUMBER OF SEQ ID NOS: 11

<210> SEQ ID NO 1
<211> LENGTH: 96
<212> TYPE: PRT
<213> ORGANISM: Homo Sapiens

<400> SEQUENCE: 1

Glu Val Arg Glu Ser Phe Gly Gly Gln Lys Cys Gly Asn Arg Phe Val
1               5                   10                  15

Glu Glu Gly Glu Glu Cys Asp Cys Gly Glu Pro Glu Glu Cys Met Asn
            20                  25                  30

Arg Cys Cys Asn Ala Thr Thr Cys Thr Leu Lys Pro Asp Ala Val Cys
        35                  40                  45

Ala His Gly Leu Cys Cys Glu Asp Cys Gln Leu Lys Pro Ala Gly Thr
    50                  55                  60

Ala Cys Arg Asp Ser Ser Asn Ser Cys Asp Leu Pro Glu Phe Cys Thr
65                  70                  75                  80

Gly Ala Ser Pro His Cys Pro Ala Asn Val Tyr Leu His Asp Gly His
                85                  90                  95

<210> SEQ ID NO 2
<211> LENGTH: 14
<212> TYPE: PRT
<213> ORGANISM: Homo Sapiens
```

```
<400> SEQUENCE: 2

Cys Arg Asp Ser Ser Asn Ser Cys Asp Leu Pro Glu Phe Cys
1               5                   10

<210> SEQ ID NO 3
<211> LENGTH: 12
<212> TYPE: PRT
<213> ORGANISM: Artificial Sequence
<220> FEATURE:
<223> OTHER INFORMATION: Synthetic peptide
<220> FEATURE:
<221> NAME/KEY: VARIANT
<222> LOCATION: (12)..(12)
<223> OTHER INFORMATION: Xaa is 2,4,6-trimethylphenylalanine (Msa)

<400> SEQUENCE: 3

Arg Asp Ser Ser Asn Ser Cys Asp Leu Pro Glu Xaa
1               5                   10

<210> SEQ ID NO 4
<211> LENGTH: 13
<212> TYPE: PRT
<213> ORGANISM: Artificial Sequence
<220> FEATURE:
<223> OTHER INFORMATION: Synthetic peptide
<220> FEATURE:
<221> NAME/KEY: VARIANT
<222> LOCATION: (1)..(1)
<223> OTHER INFORMATION: Xaa is pyroglutamic acid (Pyr)
<220> FEATURE:
<221> NAME/KEY: VARIANT
<222> LOCATION: (13)..(13)
<223> OTHER INFORMATION: Xaa is 2,4,6-trimethylphenylalanine (Msa)

<400> SEQUENCE: 4

Xaa Arg Asp Ser Ser Asn Ser Cys Asp Leu Pro Glu Xaa
1               5                   10

<210> SEQ ID NO 5
<211> LENGTH: 14
<212> TYPE: PRT
<213> ORGANISM: Artificial Sequence
<220> FEATURE:
<223> OTHER INFORMATION: Synthetic peptide
<220> FEATURE:
<221> NAME/KEY: VARIANT
<222> LOCATION: (13)..(13)
<223> OTHER INFORMATION: Xaa is 2,4,6-trimethylphenylalanine (Msa)

<400> SEQUENCE: 5

Lys Arg Asp Ser Ser Asn Ser Cys Asp Leu Pro Glu Xaa Lys
1               5                   10

<210> SEQ ID NO 6
<211> LENGTH: 15
<212> TYPE: PRT
<213> ORGANISM: Artificial Sequence
<220> FEATURE:
<223> OTHER INFORMATION: Synthetic peptide
<220> FEATURE:
<221> NAME/KEY: VARIANT
<222> LOCATION: (1)..(1)
<223> OTHER INFORMATION: Xaa is pyroglutamic acid (Pyr)
<220> FEATURE:
<221> NAME/KEY: VARIANT
<222> LOCATION: (14)..(14)
<223> OTHER INFORMATION: Xaa is 2,4,6-trimethylphenylalanine (Msa)

<400> SEQUENCE: 6

Xaa Lys Arg Asp Ser Ser Asn Ser Cys Asp Leu Pro Glu Xaa Lys
```

```
<210> SEQ ID NO 7
<211> LENGTH: 15
<212> TYPE: PRT
<213> ORGANISM: Artificial Sequence
<220> FEATURE:
<223> OTHER INFORMATION: Synthetic peptide
<220> FEATURE:
<221> NAME/KEY: VARIANT
<222> LOCATION: (1)..(1)
<223> OTHER INFORMATION: Xaa is pyroglutamic acid (Pyr)
<220> FEATURE:
<221> NAME/KEY: VARIANT
<222> LOCATION: (14)..(14)
<223> OTHER INFORMATION: Xaa is 2,4,6-trimethylphenylalanine (Msa)

<400> SEQUENCE: 7

Xaa Lys Arg Asp Ser Ser Asn Ser Met Asp Leu Pro Glu Xaa Lys
 1               5                  10                  15

<210> SEQ ID NO 8
<211> LENGTH: 14
<212> TYPE: PRT
<213> ORGANISM: Artificial Sequence
<220> FEATURE:
<223> OTHER INFORMATION: Synthetic peptide
<220> FEATURE:
<221> NAME/KEY: VARIANT
<222> LOCATION: (13)..(13)
<223> OTHER INFORMATION: Xaa is 2,4,6-trimethylphenylalanine (Msa)

<400> SEQUENCE: 8

Lys Arg Asp Ser Ser Asn Ser Met Asp Leu Pro Glu Xaa Lys
 1               5                  10

<210> SEQ ID NO 9
<211> LENGTH: 15
<212> TYPE: PRT
<213> ORGANISM: Artificial Sequence
<220> FEATURE:
<223> OTHER INFORMATION: Synthetic peptide
<220> FEATURE:
<221> NAME/KEY: VARIANT
<222> LOCATION: (1)..(1)
<223> OTHER INFORMATION: Xaa is pyroglutamic acid (Pyr)
<220> FEATURE:
<221> NAME/KEY: VARIANT
<222> LOCATION: (9)..(9)
<223> OTHER INFORMATION: Xaa is Cystine, Cys(Cys)
<220> FEATURE:
<221> NAME/KEY: VARIANT
<222> LOCATION: (14)..(14)
<223> OTHER INFORMATION: Xaa is 2,4,6-trimethylphenylalanine (Msa)

<400> SEQUENCE: 9

Xaa Lys Arg Asp Ser Ser Asn Ser Xaa Asp Leu Pro Glu Xaa Lys
 1               5                  10                  15

<210> SEQ ID NO 10
<211> LENGTH: 12
<212> TYPE: PRT
<213> ORGANISM: Artificial Sequence
<220> FEATURE:
<223> OTHER INFORMATION: Synthetic peptide

<400> SEQUENCE: 10

Arg Asp Ser Ser Asn Ser Cys Asp Leu Pro Glu Phe
 1               5                  10
```

```
<210> SEQ ID NO 11
<211> LENGTH: 15
<212> TYPE: PRT
<213> ORGANISM: Artificial Sequence
<220> FEATURE:
<223> OTHER INFORMATION: Synthetic peptide
<220> FEATURE:
<221> NAME/KEY: VARIANT
<222> LOCATION: (1)..(1)
<223> OTHER INFORMATION: Xaa1 is pyroglutamic acid (Pyr) or bond
<220> FEATURE:
<221> NAME/KEY: VARIANT
<222> LOCATION: (2)..(2)
<223> OTHER INFORMATION: Xaa2 is Lys, Cys or bond
<220> FEATURE:
<221> NAME/KEY: VARIANT
<222> LOCATION: (9)..(9)
<223> OTHER INFORMATION: Xaa3 is Cys, Met or Cys(Cys) (Cystine)
<220> FEATURE:
<221> NAME/KEY: VARIANT
<222> LOCATION: (14)..(14)
<223> OTHER INFORMATION: Xaa4 is 2,4,6 trimethylphenylalanine (Msa) or
    2,4,6 trimethylphenylglycine (Msg)
<220> FEATURE:
<221> NAME/KEY: VARIANT
<222> LOCATION: (15)..(15)
<223> OTHER INFORMATION: Xaa5 is Lys, Cys or bond

<400> SEQUENCE: 11

Xaa Xaa Arg Asp Ser Ser Asn Ser Xaa Asp Leu Pro Glu Xaa Xaa
 1               5                  10                  15
```

PEPTIDES FOR THE TREATMENT OF CANCER AND/OR METASTASIS

CROSS-REFERENCE TO RELATED APPLICATIONS

This application is a 371 U.S. National Phase of International Application No. PCT/EP2020/083987, filed Nov. 30, 2020, which claims priority to European Patent Application No. 19383084.1, filed Dec. 5, 2019. The entire disclosures of the above applications are incorporated herein by reference.

FIELD OF THE INVENTION

The present invention is within the area of biomedical chemistry. In particular, the invention relates to the field of inhibition of cancer and/or metastasis.

BACKGROUND OF THE INVENTION

Metastasis is the cause of cancer patient mortality in around 90% of the cases [Reymond et al. Nature Reviews 2016, 13(12), 858-70].

With the spread of cancer tumours due to the metastasis, regular treatments are not at all effective and the study of new therapeutic targets and treatments are needed.

ADAMS (A Disintegrin and Metalloproteinases) are a family of transmembrane proteins described for the first time in the 1990's. Multiple ADAMs members including ADAM-9, ADAM-10, ADAM-12, ADAM-15 and ADAM-17 have been shown to play a role in either cancer formation or progression. Consistent with these findings, increased expression of specific ADAMs in several cancer types was found to correlate with features of aggressive disease and poor prognosis [Duffy et al. Clin Chim Acta 2009, 403(1-2), 31-6]. Many ADAMs are involved in the regulation of growth factor activities and integrin functions leading to promotion of cell growth and invasion [Mochizuki et al. Cancer Sci 2007, 98(5):621-8; Zadka et al. Neoplasma 2018, 65(6), 823-39].

ADAM-12 was identified in 1995 searching for homologues of fertilin in a mouse myogenic cell line [Yagami-Hiromasa et al. Nature 1995, 377(6550), 652-6] and the human ADAM-12 was characterized in 1998 [Gilpin et al. J Biol Chem 1998, 73(1), 157-66]. Its structure consists of a N-terminus signal peptide, a pro-domain, a metalloproteinase (or metalloprotease) domain, a disintegrin domain, a cystein-rich domain, an EGF-domain, a transmembrane region and a cytoplasmic tail at the C-terminus. ADAM-12 has a membrane-bound form (ADAM12-L) which has all the above-mentioned domains and a secreted form (ADAM12-S), which lacks the transmembrane and the cytoplasmic domains [Nyren-Erickson et al. Biochim Biophys Acta 2013, 1830(10), 4445-55].

ADAM-12 is highly expressed in many types of cancer and tumour cells, where it can regulate cell-cell adhesion or cell-ECM interaction through its binding to adhesion molecules such as integrins and syndecans [Kveiborg et al. J Biochem Cell Biol 2008, 40(9), 1685-702]. ADAM-12 interacts with syndecan-4 and this interaction can promote cell spreading and stress fiber assembly [Thodeti et al. J Biol Chem 2003, 278(11), 9576-84].

Overall, overexpression of ADAM-12 has been correlated with metastasis and poor survival in a wide diversity of cancers.

In breast cancer, it has been published that ADAM-12 is highly expressed and acts as a promoter of breast cancer metastasis [/ba et al. Am J Pathol 1999, 154(5), 1489-501; Huang et al. Oncogene 2018, 37(49), 6316-26]. A functional study by Kveiborg et al. [Kveiborg et al. Cancer Res 2005, 65(11), 4754-61] demonstrated that ADAM-12 up-regulation accelerates tumour progression in a murine breast cancer model. It is also upregulated in tumour tissues of breast cancer compared to that of adjacent normal tissues. The results of Kaplan-Meier survival curves showed that patients with higher levels of ADAM-12 exhibited shorter survival time compared to that of low level of ADAM-12 [Ma et al. Int J Clin Exp Pathol 2015, 8(10), 13279-83]. It has been also described that the presence of ADAM-12 in urine of breast cancer patients increases proportionally to patient disease progression [Roy et al. J Biol Chem 2004, 279(49), 51323-30].

High tumour levels of ADAM-12 indicate that ADAM-12 is a prognostic factor associated with the poorest prognosis in an aggressive molecular subtype of high-grade serous ovarian carcinoma [Cheon et al. Carcinogenesis 2015, 36(7), 739-47].

ADAM-12 is highly expressed in prostate cancer [Peduto et al. Oncogene 2006, 25(39), 5462-6], glioblastoma [Kodama et al. Am. J Pathol 2004, 165(5), 1743-53] and gastric cancer [Carl-McGrath et al. Int J Oncol 2005, 26(1), 17-24; Shimura et al. Cancer Prev Research 2015, 8(3), 240-8].

Increased levels of ADAM-12 were found in patients diagnosed with pancreatic ductal adenocarcinoma compared to healthy controls, and decreased ADAM-12 levels during treatment were associated with longer survival [Veenstra et al. Oncogenesis 2018, 7(11), 87].

ADAM-12 has been also proposed as a biomarker for bladder cancer. Bladder cancer patients have a risk of progression to muscle-invasive cancer of up to 60%. Its up-regulation, at mRNA level and protein expression, has been correlated to grades and stages of bladder cancer [Frölich et al. Clin Cancer Research 2006, 12(24), 7359-68].

ADAM-12 expression is almost undetectable in normal livers, but it is increased in hepatocellular carcinomas and liver metastases [Mazzocca et al. Biochim Biophys Acta 2010, 1806(1), 74-81; Le Pabic, Hepatology 2003, 37(5), 1056-66].

Metastatic small cell lung cancer (SCLC) also exhibited increased expression of ADAM-12 along with enhanced invasion and metastasis [Shao et al. Plos One 2014, 9(1), e85936].

ADAM-12 mRNA has been detected in 70% of giant cell tumours of bone. ADAM-12 implication in the cell fusion process of mononuclear stromal cells in giant cell tumours has been also described [Tian et al. J Clin Pathol 2002, 55(6), 394-7]. Its high expression has been correlated not only with tumour growth but it has been also associated with enhanced osteolysis with a significant reduction on animal survival, suggesting that ADAM-12 could be a new therapeutic target in osteosarcoma [George et al. Eur J Cancer 2013, 49(9), 2253-63].

ADAM-12 is significantly overexpressed in advanced stage in comparison with early stage melanomas [Cireap et al. Pathol Oncol Res 2013, 19(4), 755-62].

Iba et al. described the importance of the Cys-rich domain of ADAM-12 in supporting cell adhesion in a panel of carcinoma cell lines such as MDA-MB-231 breast carcinoma cells [/ba et al. Am J Pathol 1999, 154(5), 1489-501]. According to Iba et al., in the case of human ADAM-12, recombinant polypeptides of the cysteine-rich domain but not the disintegrin-like domain supported cell adhesion of a panel of carcinoma cell lines. Subsequently, the involvement of the disintegrin domain of ADAM-12 (SEQ ID NO: 1, obtained from [Gilpin et al. J Biol Chem 1998, 73(1), 157-66]) was studied. Dyczynska et al. showed that breast cancer associated mutation in the disintegrin region of ADAM-12 interferes with the intracellular trafficking and processing of the protein [Dyczynska et al. Int J Cancer 2008, 122(11), 2634-40]. Li et al. have also described the role of the disintegrin domain of ADAM-12 in the activation of Epidermal Growth Factor Receptor (EGFR) in triple-negative breast cancer and in breast tumour-initiating cells (BTICs) [Li et al. Breast Cancer Res Treat 2012, 135(3), 759-69; Li et al. Breast Cancer Res Treat 2013, 139(3), 691-703].

α9β1 Integrin is expressed on a wide variety of cell types, interacts with many ligands as fibronectin and tenascin-C and, among them, ADAM-12. Aberrant α9β1 expression can lead to or worsen pathological conditions such as cancer [Høye et al. Adv Biol Regul 2012, 52(2), 326-39].

α9β1 Integrin expression has been associated with reduced survival in basal-like breast cancer subtype and it is thus suggested as a novel marker of this tumour subtype [Allen et al. J Pathol 2011, 223(5), 646-58]. On the contrary, its downregulation in triple negative breast cancer tumours has been correlated with decreased tumour angiogenesis, tumour growth and metastasis [Wang et al. Int J Cancer 2019, 145(10), 2767-80]. Tumour-α9β1 integrin-mediated signaling also plays a pivotal role in generating unique primary tumour tissue microenvironments which favour breast cancer growth and lymphatic metastases [Majumder et al. Plos One 2012, 7(4), e35094; Ota et al. J Mol Med 2014, 92(12), 1271-81].

ADAM-12 has been described as a ligand of a9B1 integrin supporting a9β1 integrin-mediated cell attachment and GPT-Rac dependent migration in melanoma cells [Lydolph et al. Exp Cell Research 2009, 315(19), 3312-24], but it has also been disclosed that in cases where this receptor is not expressed, it could bind to other members of the beta1 integrin family.

The disintegrin domain of ADAMs seems to play a crucial role in interacting with integrins. Most ADAMs can interact with integrins through RGD- or XCD-motifs in their disintegrin domains and, in fact, the XCD sequence region is probably primarily responsible for inhibition of platelet aggregation and for integrin interaction [Lu et al. Cardiovasc Hematol Agents Med Chem 2007, 5(1), 29-42].

Although some ADAMs have been postulated to play a role in the inhibition of cell adhesion and metastases, scarce literature can be found, however, relating to clinical applications of ADAM-12 protein or peptides thereof in the treatment of cancer and/or metastasis.

The patent application WO 2015/028027 A1 discloses monoclonal antibodies directed to the pro-domain of ADAM-12 and their use for the treatment of cancer. The pro-domain of ADAM-12 is a region far from the cysteine-rich and disintegrin domains.

WO 2006/014903 A2 discloses ADAM-12 polynucleotides or their encoded polypeptides, which are highly expressed in cancer tissues, and modulators thereof, such as antibodies. The document proposes methods of treatment and diagnosis of proliferative disorders, including cancer and psoriasis, although only the expression of ADAM-12 in cancerous tissues is disclosed and no example of activity or treatment with any compound is shown.

WO 2011/100362 A1 discloses modified ADAM-derived polypeptides comprising an ADAM-derived polypeptide from the disintegrin-like domain from an ADAM and a fusion protein comprising thioredoxin as an N-terminal segment, for use in treating cancer. The polypeptide sequences have a sequence length of about 80 amino acids, close to the full length sequence of the disintegrin domains of ADAMs.

Rhabdomyosarcoma (RMS) and neuroblastoma (NB) are examples of common pediatric cancers. Rhabdomyosarcoma (RMS), a malignant tumour of early onset, is the most common type of soft-tissue sarcoma in children [Masià et al. Br J Cancer 2012, 107(8), 1374-83]. Neuroblastoma is the most common cancer in babies and the third-most common cancer in children. Almost half of all patients presenting with neuroblastoma have disease dissemination at diagnosis [*Maris* et al. The Lancet 2007, 369 (9579), 2106-20].

Patients with metastatic disease have very poor prognosis and more intense therapies are thus indicated. Moreover, the major cause of death in these patients is the formation of distant metastases.

The implication of α9β1 integrin in the process of invasiveness and metastasis has also been described in a pediatric cancer such as rhabdomyosarcoma [Masia et al. Br J Cancer 2012, 107(8), 1374-83]. Rhabdomyosarcoma cell lines have been used as a model to establish the role of ADAM-12/α9β1 integrin interaction in myogenesis, but the role of ADAM-12 in rhabdomyosarcoma tumorigenesis has not been described. The role of ADAM-12 in neuroblastoma has neither been disclosed.

There is, therefore, the urgent need of identifying new therapeutic targets and finding new pharmacological treatments for improving the survival of patients with cancer and/or metastatic disease.

DETAILED DESCRIPTION OF THE INVENTION

The present invention provides a solution to the need of reducing or inhibiting cancer growth, invasiveness and/or the formation of metastasis in different cancers.

The inventors of the present invention, after extensive and exhaustive research, have surprisingly found a series of synthetic analogues of ADAM-12 able to reduce the metastatic potential of different cancers such as rhabdomyosarcoma, neuroblastoma and breast cancer.

The prior art does not disclose or suggest short peptides derived from the disintegrin domain of ADAM-12 substituted with non-natural amino acids for clinical use in inhibition of cancer growth and/or reduction of invasiveness and/or metastasis.

The present invention provides modified peptides (and dimers thereof) derived from the amino acid sequence of the protein ADAM-12, specifically from the disintegrin domain of ADAM-12, and acid more specifically derived from the amino sequence -CRDSSNSCDLPEFC—i.e. Cys-Arg-Asp-Ser-Ser-Asn-Ser-Cys-Asp-Leu-Pro-Glu-Phe-Cys (SEQ ID NO: 2) comprised within the disintegrin domain of ADAM-12. The modified peptides (and dimers thereof) are stable in plasma and able to inhibit invasiveness in vitro and, hence, to reduce invasiveness and metastasis in vivo. Certain modifications with synthetic amino acids, such as the introduction of mesityl amino acids, for instance 3-mesitylalanine (2,4,6-trimethylphenylalanine, Msa), in a phenylalanine position, optionally together with other modifications such as the substitution of cysteine residues and/or the inclusion of unnatural amino acids such as pyroglutamic acid in the amino terminal end of the peptide, provide new compounds with improved pharmacological properties and activity in inhibiting cancer growth and/or reducing or inhibiting cancer cell invasion and metastasis in different cancers. The cysteine residues can be substituted by methionine, cystine or by basic amino acids such as lysine.

In vitro studies with the ADAM-12 analogues of the present invention showed a reduction in invasiveness in rhabdomyosarcoma cells overexpressing (RD) and not overexpressing (RH30) a931 integrin. This fact points out that integrin could not be the exclusive target of the ADAM-12 analogues of the present invention.

Definitions

In order to facilitate the comprehension of this invention, the meanings of some terms and expressions as used in the context of the invention are included.

"Invasion" and "invasiveness" and their plurals, are related to cell migration and define the ability of cells to become motile and to navigate through the extracellular matrix within a tissue or to infiltrate neighboring tissues. Cell invasion is the intrusion on and destruction of adjacent tissues. Cancer cells that become invasive may disseminate to secondary sites and form metastases.

"Metastasis" and its plural, are focus of cancerous cells related to a preexisting cancer, referred to as primary, but developed remotely from this primary focus without continuity with it. The dissemination of these secondary foci takes place via lymphatic or hematic routes.

The terms "treatment" and its plural, as used herein, mean the administration of a compound according to the invention in order to prevent, ameliorate or eliminate the adverse clinical symptoms caused by a disease, or to reduce or eliminate the incidence or severity of said disease.

In the context of the invention, the terms "diagnosis" refers to diagnostic methods performed in the absence of the human body, this is, to in vitro diagnostic methods.

In the context of the invention, the terms "therapeutic dose" and its plural refer to the necessary amount of a compound disclosed in the invention that must be administered to an individual in order to obtain a medical or biological positive response, being the individual a cell, an animal or a human being, and being the compound administered by a researcher, a physician, a veterinary or by the individual himself or herself.

In the context of the invention, the terms "therapeutic agent" and its plural refer to any agent or compound that produces a desirable pharmacological effect in an individual (a cell, an animal or a human being).

In the context of the invention, the terms "activity" or "pharmacological activity" and their plurals refer to the biological or medical response as a result of the treatment of an individual (a cell, an animal or a human being) with a compound disclosed in the present invention, being the compound administered by a researcher, a physician, a veterinary or by the individual himself or herself.

The terms "individual" and its plural refers to any organism to which compounds described in the present invention can be administered, being the administration for experimental, diagnostic and/or therapeutic purposes. The individual can be a cell, an animal or a human being.

In the context of the present invention, the terms "peptide dimer" and its plural refer to a compound comprising two monomer units of a peptide of the present invention linked by a disulfide bridge between cysteine residues. In an homodimeric peptide of two equal peptide subunits, the peptide dimer is represented as: (peptide)$_2$ (disulfide bridge).

The terms "peptide" or "peptide analogue" and their plurals can be used as generic terms for the compounds of the present invention, encompassing both peptides and peptide dimers of the present invention.

In this description the abbreviations used for amino acids follow the IUPAC-IUB Joint Commission on Biochemical Nomenclature rules outlined in J. Biol. Chem. (1989) 264: 633-673.

Thus, for example, Asn represents $NH_2$—CH($CH_2CONH_2$)—COOH. Therefore, the dash, which represents the peptide bond, eliminates the OH of the 1-carboxyl group of the amino acid (represented here in the non-ionized conventional form) when located at the right of the symbol, and eliminates the H of the 2-amino group of the amino acid when located at the left of the symbol; both modifications can be applied to the same symbol.

The amino acid structures and their one and three letter nomenclature codes and/or structure are shown in Table 1. The amino acids can have an L- or D-configuration.

TABLE 1

Amino acid structures and their one and three letter nomenclature code.

| Name | Code/Structure |
|---|---|
| Alanine | Ala (A) |
| Arginine | Arg (R) |
| Asparagine | Asn (N) |
| Aspartic acid | Asp (D) |
| Cysteine | Cys (C) |
| Glutamine | Gln (Q) |
| Glutamic acid | Glu (E) |
| Glycine | Gly (G) |
| Histidine | His (H) |
| Isoleucine | Ile (I) |
| Leucine | Leu (L) |
| Lysine | Lys (K) |
| Methionine | Met (M) |
| Phenylalanine | Phe (F) |
| Proline | Pro (P) |
| Serine | Ser (S) |
| Threonine | Thr (T) |
| Tryptophan | Trp (W) |
| Tyrosine | Tyr (Y) |
| Valine | Val (V) |
| Phenylglycine | Phg |
| Pyroglutamic acid | Pyr |
| 2,4,6-trimethylphenyl alanine or 3-mesitylalanine | Msa |

TABLE 1-continued

Amino acid structures and their one and three letter nomenclature code.

| Name | Code/Structure |
|---|---|
| 2,4,6-trimethylphenyl glycine or 2-mesitylglycine | 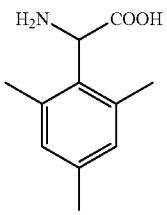 Msg |
| Cystine, Cys(Cys) | 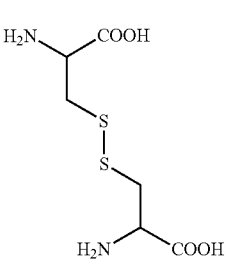 [SMILES: NC(CSSCC(N)C(=O)O)C(=O)O] |

The abbreviation "Ac-" is used in this description to name the acetyl group ($CH_3$—CO—). The octanoyl group refers to n-octanoyl or capryloyl group.

In the context of this invention, the term "mesityl amino acid" and its plural encompass 3-mesitylalanine (2,4,6 trimethylphenylalanine, Msa) and 2-mesitylglycine (2,4,6 trimethylphenylglycine, Msg).

The term "non-cyclic aliphatic group" is used in this invention to encompass, for example and not restricted to, linear or branched alkyl, alkenyl and alkynyl groups.

The term "alkyl group" relates to a saturated, linear or branched group, which has between 1 and 24, preferably between 1 and 16, more preferably between 1 and 14, even more preferably between 1 and 12, and even more preferably still between 1, 2, 3, 4, 5 or 6 carbon atoms and which is bound to the rest of the molecule by a simple bond, including, for example and not restricted to, methyl, ethyl, isopropyl, isobutyl, tert-butyl, heptyl, octyl, decyl, dodecyl, lauryl, hexadecyl, octadecyl, amyl, 2-ethylhexyl, 2-methylbutyl, 5-methylhexyl and similar.

The term "alkenyl group" refers to a linear or branched group which has between 2 and 24, preferably between 2 and 16, more preferably between 2 and 14, even more preferably between 2 and 12, even more preferably still 2, 3, 4, 5 or 6 carbon atoms, with one or more carbon-carbon double bonds, preferably with 1, 2 or 3 carbon-carbon double bonds, conjugated or unconjugated, which is bound to the rest of the molecule through a single bond, including, for example and not restricted to, the vinyl, oleyl, linoleyl and similar groups.

The term "alkynyl group" refers to a linear or branched group which has between 2 and 24, preferably between 2 and 16, more preferably between 2 and 14, even more preferably between 2 and 12, even more preferably still 2, 3, 4, 5 or 6 carbon atoms, with one or more carbon-carbon triple bonds, preferably with 1, 2 or 3 carbon-carbon triple bonds, conjugated or unconjugated, which is bound to the rest of the molecule through a single bond, including, for example and not restricted to, the ethynyl group, 1-propynyl, 2-propynyl, 1-butynyl, 2-butynyl, 3-butynyl, pentynyl, such as 1-pentynyl and similar groups.

The term "alicyclic group" is used in this invention to encompass, for example and not restricted to, cycloalkyl or cycloalkenyl or cycloalkynyl groups.

The term "cycloalkyl" relates to a saturated mono- or polycyclic aliphatic group which has between 3 and 24, preferably between 3 and 16, more preferably between 3 and 14, even more preferably between 3 and 12, even more preferably still 3, 4, 5 or 6 carbon atoms and which is bound to the rest of the molecule through a single bond, including, for example and not limited to, cyclopropyl, cyclobutyl, cyclopentyl, cyclohexyl, cycloheptyl, methyl cyclohexyl, dimethyl cyclohexyl, octahydroindene, decahydronaphthalene, dodecahydro-phenalene and similar.

The term "cycloalkenyl" relates to a non-aromatic mono- or polycyclic aliphatic group which has between 5 and 24, preferably between 5 and 16, more preferably between 5 and 14, even more preferably between 5 and 12, even more preferably still 5 or 6 carbon atoms, with one or more carbon-carbon double bonds, preferably with 1, 2 or 3 carbon-carbon double bonds, conjugated or unconjugated, which is bound to the rest of the molecule through a single bond, including, for example and not restricted to, the cyclopent-1-en-1-yl group and similar groups.

The term "cycloalkynyl" relates to a non-aromatic mono- or polycyclic aliphatic group which has between 8 and 24, preferably between 8 and 16, more preferably between 8 and 14, even more preferably between 8 and 12, even more preferably still 8 or 9 carbon atoms, with one or more carbon-carbon triple bonds, preferably with 1, 2 or 3 carbon-carbon triple bonds, conjugated or unconjugated, which is bound to the rest of the molecule through a single bond, including, for example and not restricted to, the cyclooct-2-yn-1-yl group and similar.

The term "aryl group" relates to an aromatic group which has between 6 and 30, preferably between 6 and 18, more preferably between 6 and 10, even more preferably 6 or 10 carbon atoms, which comprises 1, 2, 3 or 4 aromatic rings, bound by a carbon-carbon bond or fused, and which is bound to the rest of the molecule through a single bond, including, for example and not restricted to, phenyl, naphthyl, diphenyl, indenyl, phenanthryl or anthryl among others.

The term "aralkyl group" relates to an alkyl group substituted by an aromatic group, with between 7 and 24 carbon atoms and including, for example and not restricted to, —$(CH_2)_{1-6}$-phenyl, —$(CH_2)_{1-6}$-(1-naphtyl), —$(CH_2)_{1-6}$-(2-naphtyl), —$(CH_2)_{1-6}$—CH(phenyl)$_2$ and similar.

The term "heterocyclic group" relates to a 3-10 member heterocyclyl or hydrocarbon ring, in which one or more of the ring atoms, preferably 1, 2 or 3 of the ring atoms, is an element different to carbon, such as nitrogen, oxygen or sulfur and may be saturated or unsaturated. For the purposes of this invention, the heterocyclyl can be a cyclic, monocyclic, bicyclic or tricyclic system which may include fused ring systems; and the nitrogen, carbon or sulfur atoms can be optionally oxidized in the heterocyclyl radical; the nitrogen atom can optionally be quaternized; and the heterocyclyl radical may be partially or completely saturated or may be aromatic. With increasing preference, the term heterocyclic relates to a 5 or 6 membered ring.

The term "heteroarylalkyl group" relates to an alkyl group substituted with a substituted or unsubstituted aromatic heterocyclyl group, the alkyl group having from 1 to 6 carbon atoms and the aromatic heterocyclyl group between 2 and 24 carbon atoms and from 1 to 3 atoms other than carbon and including, for example and not restricted to, —(CH$_2$)$_{1-6}$-imidazolyl, —(CH$_2$)$_{1-6}$-triazolyl, —(CH$_2$)$_{1-6}$-thienyl, —(CH$_2$)$_{1-6}$-furyl, —(CH$_2$)$_{1-6}$-pyrrolidinyl and similar.

As used in this technical area, there may be a certain degree of substitution on the groups defined above. Thus, there can be substitution in any of the groups of this invention. The references in this document to groups substituted in the groups of this invention indicate that the radical specified can be substituted in one or more available positions by one or more substituents, preferably in 1, 2 or 3 positions, more preferably in 1 or 2 positions, even more preferably in 1 position. These substituents include, for example and not restricted to, $C_1$-$C_4$ alkyl; hydroxyl; $C_1$-$C_4$ alcoxyl; amino; $C_1$-$C_4$ aminoalkyl; $C_1$-$C_4$ carbonyloxyl; $C_1$-$C_4$ oxycarbonyl; halogen such as fluorine, chlorine, bromine and iodine; cyano; nitro; azido; $C_1$-$C_4$ alkylsulfonyl; thiol; $C_1$-$C_4$ alkylthio, aryloxyl such as phenoxyl; —NR$_b$(C═NR$_b$)NR$_b$R$_c$; where R$_b$ and R$_c$ are independently selected from the group consisting of H, $C_1$-$C_4$ alkyl, $C_2$-$C_4$ alkenyl, $C_2$-$C_4$ alkynyl, $C_3$-$C_{10}$ cycloalkyl, $C_6$-$C_{18}$ aryl, $C_7$-$C_{17}$ aralkyl, 3-10-membered-heterocyclyl or an amino protecting group.

The "percentage of identity" regarding peptides, polypeptides and proteins, as used herein, has the meaning commonly attributed in the state of the art and, hence, relates to the percentage of amino acids which are identical between two amino acid sequences which are compared after an optimal alignment of these sequences, where said percentage is merely statistical and the differences between the two amino acid sequences are randomly distributed throughout the sequence. "Optimal alignment" is understood as that alignment of amino acid sequences giving rise to a greater percentage of identity. The percentage of identity is calculated by determining the number of identical positions in which an amino acid is identical in the two compared sequences, dividing the number of identical positions by the number of compared positions and multiplying the result obtained by 100 to obtain the percentage of identity between the two sequences. The sequence comparisons between two amino acid sequences can be carried out manually or by means of computer programs known in the state of the art, such as the BLAST (Basic Local Alignment Search Tool) algorithm.

Compounds of the Invention

A first aspect of the present invention refers to a peptide of general formula (I):

(I)

R$_1$-AA$_1$-AA$_2$-Arg-Asp-Ser-Ser-Asn-Ser-AA$_3$-Asp-Leu-Pro-Glu-AA$_4$-AA$_5$-R$_2$
(R$_1$-SEQ ID NO: 11-R$_2$)

its stereoisomers, mixtures thereof and/or its pharmaceutically acceptable salts, characterized in that AA$_1$ Pyr or bond;
AA$_2$ is Lys, Cys or bond;
AA$_3$ is Cys, Met or Cys(Cys) (Cystine);
AA$_4$ is 2,4,6-trimethylphenylalanine (Msa) or 2,4,6-trimethylphenylglycine (Msg);
AA$_5$ is Lys, Cys or bond;
R$_1$ is selected from the group consisting of H, substituted or unsubstituted non-cyclic aliphatic group, substituted or unsubstituted alicyclyl, substituted or unsubstituted heterocyclyl, substituted or unsubstituted heteroarylalkyl, substituted or unsubstituted aryl, substituted or unsubstituted aralkyl, a polymer derived from polyethylene glycol and R$_5$—CO—, wherein R$_5$ is selected from the group consisting of H, substituted or unsubstituted non-cyclic aliphatic group, substituted or unsubstituted alicyclyl, substituted or unsubstituted aryl, substituted or unsubstituted aralkyl, substituted or unsubstituted heterocyclyl and substituted or unsubstituted heteroarylalkyl;

R$_2$ is selected from the group consisting of —NR$_3$R$_4$, —OR$_3$ and —SR$_3$, wherein R$_3$ and R$_4$ are independently selected from the group consisting of H, substituted or unsubstituted non-cyclic aliphatic group, substituted or unsubstituted alicyclyl, substituted or unsubstituted heterocyclyl, substituted or unsubstituted heteroarylalkyl, substituted or unsubstituted aryl and substituted or unsubstituted aralkyl.

In a preferred embodiment, AA$_4$ in general formula (I) is 2,4,6-trimethylphenylalanine (Msa).

In another preferred embodiment, AA$_2$ and AA$_5$ in general formula (I) are independently selected from Lys or bond.

The R$_1$ and R$_2$ groups are bound to the amino-terminal (N-terminal) and carboxy-terminal (C-terminal) ends of the peptide sequences, respectively.

According to a preferred embodiment of this invention, R$_1$ is selected from the group consisting of H or R$_5$—CO—, wherein R$_5$ is selected from the group consisting of substituted or unsubstituted $C_1$-$C_{24}$ alkyl, substituted or unsubstituted $C_2$-$C_{24}$ alkenyl, substituted or unsubstituted $C_2$-$C_{24}$ alkynyl, substituted or unsubstituted $C_3$-$C_{24}$ cycloalkyl, substituted or unsubstituted $C_5$-$C_{24}$ cycloalkenyl, substituted or unsubstituted $C_8$-$C_{24}$ cycloalkynyl, substituted or unsubstituted $C_6$-$C_{30}$ aryl, substituted or unsubstituted $C_7$-$C_{24}$ aralkyl, substituted or unsubstituted heterocyclyl with 3-10 ring members, and substituted or unsubstituted heteroarylalkyl of 2 to 24 carbon atoms and 1 to 3 atoms other than carbon and an alkyl chain of 1 to 6 carbon atoms. Preferably, R$_5$ is selected from the group consisting of substituted or unsubstituted $C_1$-$C_{24}$ alkyl, substituted or unsubstituted $C_2$-$C_{24}$ alkenyl and substituted or unsubstituted $C_3$-$C_{24}$ cycloalkyl. More preferably, R$_1$ is selected from H, acetyl, tert-butanoyl, hexanoyl, 2-methylhexanoyl, cyclohexancarboxyl, octanoyl, decanoyl, lauroyl, myristoyl, palmitoyl, stearoyl, oleoyl and linoleoyl. Even more preferably, R$_1$ is H, acetyl, octanoyl, lauroyl, myristoyl or palmitoyl. In an even more preferred embodiment, R$_1$ is acetyl, octanoyl or palmitoyl.

According to another preferred embodiment, R$_2$ is -NR$_3$R$_4$, —OR$_3$ or -SR$_3$, wherein R$_3$ and R$_4$ are independently selected from the group consisting of H, substituted or unsubstituted $C_1$-$C_{24}$ alkyl, substituted or unsubstituted $C_2$-$C_{24}$ alkenyl, substituted or unsubstituted $C_2$-$C_{24}$ alkynyl, substituted or unsubstituted $C_3$-$C_{24}$ cycloalkyl, substituted or unsubstituted $C_5$-$C_{24}$ cycloalkenyl, substituted or unsubstituted $C_8$-$C_{24}$ cycloalkynyl, substituted or unsubstituted $C_6$-$C_{30}$ aryl, substituted or unsubstituted $C_7$-$C_{24}$ aralkyl, substituted or unsubstituted heterocyclyl with 3-10 ring members, and substituted or unsubstituted heteroarylalkyl of 2 to 24 carbon atoms and 1 to 3 atoms other than carbon and an alkyl chain of 1 to 6 carbon atoms. Preferably, R$_3$ and R$_4$ are independently selected from the group consisting of H, substituted or unsubstituted $C_1$-$C_{24}$ alkyl, substituted or unsubstituted $C_2$-$C_{24}$ alkenyl and substituted or unsubstituted $C_3$-$C_{24}$ cycloalkyl. Optionally, R$_3$ and R$_4$ can be bound through a saturated or unsaturated carbon-carbon bond, forming a cycle with the nitrogen atom. Preferably, R$_2$ is —NR$_3$R$_4$ or —OR$_3$. More preferably R$_3$ and R$_4$ are selected from the group consisting of H, methyl, ethyl, propyl, butyl, pentyl, hexyl, octyl, decyl, dodecyl and hexadecyl. Even more preferably $R_3$ is H and $R_4$ is selected from the group consisting of H, methyl, ethyl, hexyl, dodecyl and hexadecyl. According to an even more preferable embodiment, $R_2$ is selected from —OH and —NH$_2$.

In a particular aspect, the present invention also relates to a peptide dimer comprising two peptides of formula (I) of the present invention, its stereoisomers, mixtures thereof and/or its pharmaceutically acceptable salts, characterized in that the peptide dimer is a disulfide-bridged peptide dimer.

In a preferred embodiment, the peptide dimer is a homodimeric peptide. Also preferably, the peptide dimer is formed by a disulfide bridge between two equal peptide monomers of formula (I) of the present invention when AA$_3$ is Cys and AA$_2$ and AA$_5$ are independently Lys or bond.

Preferably, the peptides or the peptide dimers of the present invention are selected from the group consisting of:

```
R1-Arg-Asp-Ser-Ser-Asn-Ser-Cys-

Asp-Leu-Pro-Glu-Msa-R2
(R1-SEQ ID NO: 3-R2)

Pyr-Arg-Asp-Ser-Ser-Asn-Ser-Cys-

Asp-Leu-Pro-Glu-Msa-R2
(SEQ ID NO: 4-R2)

R1-Lys-Arg-Asp-Ser-Ser-Asn-Ser-

Cys-Asp-Leu-Pro-Glu-Msa-Lys-R2
(R1-SEQ ID NO: 5-R2)

Pyr-Lys-Arg-Asp-Ser-Ser-Asn-Ser-

Cys-Asp-Leu-Pro-Glu-Msa-Lys-R2
(SEQ ID NO: 6-R2)

Pyr-Lys-Arg-Asp-Ser-Ser-Asn-Ser-

Met-Asp-Leu-Pro-Glu-Msa-Lys-R2
(SEQ ID NO: 7-R2)

(Pyr-Lys-Arg-Asp-Ser-Ser-Asn-Ser-

Cys-Asp-Leu-Pro-Glu-Msa-Lys-R2)2
(disulfide bridge)
[(SEQ ID NO: 6-R2)2(disulfide bridge)]

R1-Lys-Arg-Asp-Ser-Ser-Asn-Ser-

Met-Asp-Leu-Pro-Glu-Msa-Lys-R2
(R1-SEQ ID NO: 8-R2)

Pyr-Lys-Arg-Asp-Ser-Ser-Asn-Ser-

Cys(Cys)-Asp-Leu-Pro-Glu-Msa-Lys-R2
(SEQ ID NO: 9-R2)
``` wherein $R_1$ and $R_2$ are as defined above.

More preferably, the peptides or the peptide dimers of the present invention are selected from the group consisting of:

```
Ac-Arg-Asp-Ser-Ser-Asn-Ser-Cys-

Asp-Leu-Pro-Glu-Msa-NH2
(Ac-SEQ ID NO: 3-NH2)

Octanoyl-Arg-Asp-Ser-Ser-Asn-

Ser-Cys-Asp-Leu-Pro-Glu-Msa-NH2
(Octanoyl-SEQ ID NO: 3-NH2)

Pyr-Arg-Asp-Ser-Ser-Asn-Ser-Cys-

Asp-Leu-Pro-Glu-Msa-NH2
(SEQ ID NO: 4- NH2)

Ac-Lys-Arg-Asp-Ser-Ser-Asn-Ser-

Cys-Asp-Leu-Pro-Glu-Msa-Lys-NH2
(Ac-SEQ ID NO: 5-NH2)

Octanoyl-Lys-Arg-Asp-Ser-Ser-Asn-

Ser-Cys-Asp-Leu-Pro-Glu-Msa-Lys-NH2
(Octanoyl-SEQ ID NO: 5-NH2)

Pyr-Lys-Arg-Asp-Ser-Ser-Asn-Ser-Cys-

Asp-Leu-Pro-Glu-Msa-Lys-NH2
(SEQ ID NO: 6-NH2)

Pyr-Lys-Arg-Asp-Ser-Ser-Asn-Ser-Met-

Asp-Leu-Pro-Glu-Msa-Lys-NH2
(SEQ ID NO: 7-NH2)

(Pyr-Lys-Arg-Asp-Ser-Ser-Asn-Ser-Cys-

Asp-Leu-Pro-Glu-Msa-Lys-NH2)2
(disulfide bridge)
[(SEQ ID NO: 6-NH2)2 (disulfide bridge)]

Octanoyl-Lys-Arg-Asp-Ser-Ser-Asn-Ser-

Met-Asp-Leu-Pro-Glu-Msa-Lys-NH2
(Octanoyl-SEQ ID NO: 8-NH2)

Pyr-Lys-Arg-Asp-Ser-Ser-Asn-Ser-Cys (Cys)-Asp-Leu-Pro-Glu-Msa-Lys-NH2
(SEQ ID NO: 9-NH2)
```

The amino acids which form the peptides and the peptide dimers can have an L- or D-configuration, or combinations thereof.

For example, when it is indicated that AA$_5$ can be Lys, it is understood that AA$_5$ is selected from L-Lys or D-Lys. The preparation processes described in this document allow the person skilled in the art to obtain each of the stereoisomers of the peptides or peptide dimers of the present invention by choosing the amino acid with the appropriate configuration.

In a preferred embodiment, the amino acids of the peptides or peptide dimers of the present invention are L-amino acids. The preferred structures of the peptides and peptide dimers of the present invention are pure isomers, i.e., enantiomers or diastereomers.

In the context of this invention, the term "uncodified amino acid" and its plural relate to those amino acids not codified by the genetic code, natural or unnatural, such as for example, pyroglutamic acid or cystine, or the synthetic amino acids 2,4,6-trimethylphenylalanine (Msa) or 2,4,6-trimethylphenylglycine (Msg) (see Table 1).

The amino acid sequences of the peptides and the peptide dimers of the present invention may include modifications of the given sequence. Such modifications are well known to those skilled in the art. For instance, one or more of the L-amino acids of the amino acid sequences of the peptides and peptide dimers of the present invention may be replaced by a D-amino acid in order to increase their stability. For instance, N-acylation and/or C-amidation or C-esterification of the amino acid sequences of the peptides and peptide dimers of the present invention may increase their resistance to proteolysis. For instance, cyclization of one or more of the amino acid sequences of the peptides of the present invention may increase their stability and permeability. For instance, one or more of the amino acids of the amino acid sequences of the peptides and the peptide dimers of the present invention may be N-alkylated (generally N-methylated) in order to improve their stability. For instance, the one or more amino acid sequences of the peptides and peptide dimers of the present invention may be conjugated to one or more macromolecules (for example, polyethylene glycol (PEG), albumin), in order to improve their stability and/or reduce renal clearance.

The pharmaceutically acceptable salts of the peptides and the peptide dimers provided by this invention are also within the scope of this invention. The term "pharmaceutically acceptable salts" means a salt recognized for its use in animals and more particularly in human beings, and includes salts used to form base addition salts, whether they are inorganic, for example and not restricted to, lithium, sodium, potassium, calcium, magnesium, manganese, copper, zinc or aluminium, amongst others; or organic, for example and not restricted to, ethylamine, diethylamine, ethylenediamine, ethanolamine, diethanolamine, arginine, lysine, histidine or piperazine among others, or acid addition salts, whether organic, for example and not restricted to, acetate, citrate, lactate, malonate, maleate, tartrate, fumarate, benzoate, aspartate, diaspartate, triaspartate, glutamate, succinate, oleate, trifluoroacetate, oxalate, pamoate or gluconate amongst others; or inorganic, for example and not restricted to, chloride, sulfate, borate or carbonate amongst others. The nature of the salt is not critical, provided that it is pharmaceutically acceptable. The pharmaceutically acceptable salts of the peptides and peptide dimers of the present invention can be obtained by conventional methods that are well known in prior art [Berge et al. J Pharm Sci 1977, 66(1), 1-19].

Also included within the present invention are peptides or peptide dimers with conservative or non-conservative substitutions which still show the activities described herein for the peptides of the present invention, more preferably conservative substitutions. Also included within the present invention are peptides or peptide dimers with a percentage identity of 80%, more preferably, 85%, more preferably 90%, more preferably 95%, more preferably 96%, 97%, 98% or 99% with regard to any of the peptides or peptide dimers of the present invention and which still show the activities described herein for the peptides of the present invention, more preferably conservative substitutions.

Preparation Process

The peptides and the peptide dimers of the present invention, their stereoisomers or their pharmaceutically acceptable salts, can be synthesized according to conventional methods known in the state of the art. In an embodiment of the present invention, the peptides and the peptide dimers are synthesized by means of solution or solid phase peptide synthesis methods.

The solid phase synthesis methods are described for example in [Stewart J. M. and Young J. D., 1984, "Solid Phase Peptide Synthesis, 2nd edition" Pierce Chemical Company, Rockford, Illinois; Bodanszky M., and Bodanszky A., 1984 "The practice of Peptide Synthesis" Springer Verlag, Berlin; Lloyd-Williams P., Albericio F. and Giralt E. (1997) "Chemical Approaches to the Synthesis of Peptides and Proteins" CRC, Boca Raton, FL, USA]. Synthesis in solution methods and combinations of solid phase synthesis and in solution methods or enzymatic synthesis are described in [Kullmann, J Biol Chem 1980, 255(17), 8234-8238].

For example, a method of obtaining the peptides and the peptide dimers of the present invention comprises the steps of:
coupling an amino acid with the N-terminal end protected and the C-terminal end free, onto an amino acid with the N-terminal end free and the C-terminal end protected or bound to a solid support;
removing the protective group of the N-terminal end;
repetition of the sequence of coupling and removal of the protective group of the N-terminal end until the desired peptidic sequence is obtained;
removal of the protective group of the C-terminal end or cleavage from the solid support.
optionally, oxidation of the obtained peptide to yield a disulfide-bridged peptide dimer.

In an embodiment of the present invention, the peptides and the peptide dimers of the present invention, their stereoisomers or their pharmaceutically acceptable salts, are prepared by means of a method comprising the steps of:
a) Solid phase peptide synthesis in a polymeric support;
b) Cleaving the peptide from the polymeric support, preferably by means of acid treatment;
c) Optionally, oxidation of the peptide in solution to obtain a cyclic peptide or a peptide dimer;
d) If needed, eliminating the protecting groups, preferably with trifluoroacetic acid;
or alternatively,
i) Solid phase peptide synthesis in a polymeric support;
ii) Optionally, solid phase peptide cycling or dimer formation in the polymeric support;
iii) Cleaving the peptide from the polymeric support and, if needed, simultaneously eliminating the protecting groups, preferably by means of treatment with trifluoroacetic acid;
iv) Optionally, oxidation of the peptide in solution to obtain a peptide dimer.

In a preferred embodiment, the peptide dimers of the present invention are obtained by oxidation of the peptides of the present invention in solution phase. The free sulfhydryl groups of the cysteine residues of the peptides can be oxidized to form disulfide-bridged peptide dimers. Preferably, the oxidation is performed with dimethyl sulfoxide (DMSO).

Preferably, the C-terminal end is bound to a polymeric support and the process is developed in solid phase and therefore comprises coupling of an amino acid with the N-terminal end protected and the C-terminal end free onto an amino acid with the N-terminal end free and the C-terminal end bound to a polymeric support; removal of the protecting group from the N-terminal end; and repetition of this sequence as many times as needed to obtain the target peptide sequence, followed finally by cleaving the synthesized peptide or peptide dimer from the original polymeric support. Optionally, the peptide can be a cyclic peptide and the cyclization step can be performed before or after the cleavage from the polymeric support. The functional groups of the amino acid side chains are maintained suitably protected with temporary or permanent protecting groups throughout synthesis, and they can be deprotected simultaneously or orthogonally to the process of cleaving the peptide from the polymeric support.

Alternatively, the solid phase synthesis can be performed by means of a convergent strategy by coupling a peptide fragment on the polymeric support or on a peptide fragment previously bound to the polymeric support. Convergent synthesis strategies are well known by persons skilled in the art and are described in Lloyd-Williams P. et al. Tetrahedron 1993, 49(48), 11065-11133.

The process can comprise the additional steps of deprotecting the N-terminal and C-terminal ends and/or cleaving the peptide from the polymeric support in an indistinct order, using standard processes and conditions known in the art, after which the functional groups of said ends can be modified. The optional modification of the N-terminal and C-terminal ends can be performed with the peptide of formula (I) of the present invention anchored to the polymeric support or once the peptide has been cleaved from the polymeric support.

Optionally, $R_1$ may be introduced by reacting the N-terminal end of the peptide of the present invention with an $R_1$-Z compound, wherein $R_1$ has the aforementioned meaning and Z is a leaving group, for example and not restricted to, the tosyl group, the mesyl group and halogen groups amongst others; through a nucleophilic substitution reaction, in the presence of a suitable base and solvent, wherein the fragments possess the functional groups that are not involved in the N—C bond formation and are conveniently protected with temporary or permanent protecting groups. $R_1$ may also be introduced by the reaction of the N-terminal end of the compound of the present invention with a $R_5COOH$ group or its esters, acid halides or its anhydride, $R_5$ being as already defined above.

Optionally and/or additionally, the $R_2$ radicals can be introduced by the reaction of a $HR_2$ compound wherein $R_2$ is —$OR_3$, —$NR_3R_4$ or —$SR_3$, with a complementary fragment which corresponds to the peptide of formula (I) of the present invention in which $R_2$ is —OH in the presence of an appropriate solvent and a base such as, N,N-diisopropylethylamine (DIEA) or triethylamine or an additive such as 1-hydroxybenzotriazole (HOBt) or 1-hydroxyazabenzotriazole (HOAt) and a dehydrating agent, such as a carbodiimide, an uronium salt, a phosphonium salt or an amidinium salt, amongst others, to thereby obtain a peptide according to the invention of general formula (I), wherein said fragments possess functional groups that are not involved in the N—C, O—C or S—C bond formation and are suitably protected with temporary or permanent protecting groups. Alternatively, other $R_2$ radicals can be incorporated simultaneously to the peptide cleavage process from the polymeric support.

A person skilled in the art would easily understand that the stages of deprotection/cleavage of the C-terminal and N-terminal ends and their subsequent derivatization can be performed in an indistinct order, according to the processes known in prior art. [Smith M. B. and March J., 1999 "March's Advanced Organic Chemistry Reactions, Mechanisms and Structure", 5th Edition, John Wiley & Sons, 2001].

The terms "protecting group" and its plural relate to a group which blocks an organic functional group and which can be removed under controlled conditions. The protecting groups, their relative reactivities and the conditions in which they remain inert are known by the person skilled in the art.

Examples of representative protecting groups for the amino group are the amides, such as amide acetate, amide benzoate, amide pivalate; carbamates, such as benzyloxycarbonyl (Cbz or Z), 2-chlorobenzyloxycarbonyl (ClZ), para-nitrobenzyloxycarbonyl (pNZ), tert-butyloxycarbonyl (Boc), 2,2,2-trichloroethoxycarbonyl (Troc), 2-(trimethylsilyl)ethoxycarbonyl (Teoc), 9-fluorenylmethoxycarbonyl (Fmoc) or allyloxycarbonyl (Alloc), trityl (Trt), methoxytrityl (Mtt), 2,4-dinitrophenyl (Dnp), N-[1-(4,4-dimethyl-2,6-dioxocyclohex-1-ylidene)ethyl] (Dde), 1-(4,4-dimethyl-2,6-dioxo-cyclohexylidene)-3-methyl-butyl (ivDde), 1-(1-adamantyl)-1-methylethoxy-carbonyl (Adpoc), among others; preferably, Boc or Fmoc.

Examples of representative protecting groups for the carboxyl group are the esters, such as the tert-butyl (tBu) ester, allyl (All) ester, triphenylmethyl ester (trityl ester, Trt ester), cyclohexyl (cHx) ester, benzyl (Bzl) ester, ortho-nitrobenzyl ester, para-nitrobenzyl ester, para-methoxybenzyl ester, trimethylsilylethyl ester, 2-phenylisopropyl ester, fluorenylmethyl (Fm) ester, 4-(N-[1-(4,4-dimethyl-2,6-dioxocyclohexylidene)-3-methylbutyl]amino)benzyl (Dmab) ester, among others; preferred protecting groups of the present invention are All, tBu, cHex, Bzl and Trt esters.

The trifunctional amino acids can be protected during the synthetic process with temporary or permanent protecting groups orthogonal to the protecting groups of the N-terminal and C-terminal ends. The amino group protecting groups described above are used to protect the amino group of the lysine side chain; the guanidine group of the arginine side chain can be protected with the nitro group, allyloxycarbonyl (Alloc), para-toluenesulfonyl (tosyl, Tos), 2,2,5,7,8-pentamethylchroman-6-sulfonyl (Pmc), 2,2,4,6,7-pentamethyldihydrobenzofuran-5-sulfonyl (Pbf) or 4-methoxy-2,3,6-trimethylbenzenesulfonyl (Mtr), the serine and threonine side chain is protected with tert-butyl (tBu) ester; the cysteine side chain can be protected with a protecting group selected from the group consisting of trityl and acetamidomethyl; and the asparagine side chain can be protected with a protecting group selected from the group consisting of methoxytrityl, trityl and xanthyl or it may be unprotected. For the protection of the carboxyl group of the aspartic acid and glutamic acid side chains esters can be used, such as the tert-butyl ester (tBu), allyl ester (All), triphenylmethyl ester (trityl ester, Trt), cyclohexyl ester (cHx), benzyl ester (Bzl), ortho-nitrobenzyl ester, para-nitrobenzyl ester, para-methoxybenzyl ester, trimethylsilylethyl ester, 2-phenylisopropyl ester, fluorenylmethyl ester (Fm), 4-(N-[1-(4,4-dimethyl-2,6-dioxocyclohexylidene)-3-methylbutyl]amino) benzyl ester (Dmab), among others. The methionine side chain is protected with sulfoxide or is used unprotected.

Preferred trifunctional amino acid protecting groups of the present invention are tBu esters in the serine and threonine and in the aspartic acid and glutamic acid side chains; Boc in the lysine side chains, Trt in the cysteine side chains and Fmoc or Boc as a temporary protecting group of the N-terminal end.

Examples of these and additional protecting groups, their introduction and removal, can be found in literature [Greene T. W. and Wuts P. G. M., (1999) "Protective groups in organic synthesis" John Wiley & Sons, New York; Atherton B. and Sheppard R. C. (1989) "Solid Phase Peptide Synthesis: A practical approach" IRL Oxford University Press]. The terms "protecting group" and it plural also includes the polymeric supports used in solid phase synthesis.

When the synthesis is performed totally or partially in solid phase, the possible solid supports used in the procedure of the present invention can involve polystyrene supports, polyethylene glycol grafted to polystyrene and such like, for example and not restricted to, p-methylbenzhydrylamine resins (MBHA) [Matsueda et al. Peptides 1981, 2(1), 45-50], 2-chlorotrityl resins [Barlos et al. Tetrahedron Lett 1989, 30, 3943-3946; Barlos K. et al. Tetrahedron Lett. 1989, 30, 3947-3951], TentaGel® resins (Rapp Polymere GmbH), ChemMatrix® resins (Matrix Innovation, Inc) and such like, which may or may not include a labile linker, such as 5-(4-aminomethyl-3,5-dimethoxyphenoxy) valeric acid (PAL) [Albericio et al. J Org Chem 1990, 55(3), 3730-3743], 2-[4-aminomethyl-(2,4-dimethoxyphenyl)] phenoxyl acetic acid (AM) [Rink 1987, Tetrahedron Lett 28(33), 3787-90], Wang [Wang, J Am Chem Soc 1973, 95(4), 1328-33] and such like, which enable cleavage of the semi-protected peptide and formation of the cycle in solution with a deprotection step in solution or even solid phase cyclisation and the subsequent simultaneous deprotection and cleavage of the peptide.

Pharmaceutical Compositions

The peptides and the peptide dimers of the present invention can be administered by any means that cause contact between the peptides and the peptide dimers and their action site in a mammal's body, preferably that of a human being, and in the form of a composition which contains them.

To this regard, another aspect of the present invention is a pharmaceutical composition which comprises a pharmaceutical effective amount of at least one peptide and/or at least one peptide dimer of the present invention, its stereoisomers, mixtures thereof and/or its pharmaceutically acceptable salts. The pharmaceutical composition of the present invention can include the peptide or the peptide dimer of the present invention obtained by freeze-drying or spray-drying, and can be reconstituted in a solvent suitable for its administration.

The peptides and peptide dimers of the present invention have variable solubility in water, according to the nature of their sequence or any possible modifications in the N-terminal and/or C-terminal ends. Therefore, the peptides and peptide dimers of the present invention can be incorporated into the compositions by means of an aqueous solution, and those which are not soluble in water can be solubilized in pharmaceutically acceptable conventional solvents such as, and not restricted to, ethanol, propanol, isopropanol, propylene glycol, glycerol, butylene glycol or polyethylene glycol or any combination thereof.

The pharmaceutically effective amount of the peptides and peptide dimers of the present invention which must be administered, and their dosage, will depend on numerous factors, including age, state of the patient, the nature or severity of the disorder or disease to be treated or prevented, the route and frequency of administration as well as on the specific nature of the peptides to be used.

"Pharmaceutically effective amount" is understood to mean a non-toxic but sufficient amount of the peptide or the peptide dimer of the present invention to provide the desired pharmaceutical effect (this is, prevention treatment and/or amelioration of the pathology to be treated). The peptides and peptide dimers of the present invention are used in the pharmaceutical composition of this invention at pharmaceutically effective concentrations to achieve the desired pharmaceutical effect; in their preferred form, the efficient daily dosage in humans is between 0.001 to 250 mg/kg, more preferably between 0.005 to 100 mg/kg, more preferably between 0.01 to 50 mg/kg and, even more preferably between 0.01 to 10 mg/kg.

The frequency of administration of the pharmaceutical composition can be, for example and not limited to, monthly, fortnightly, weekly, twice a week, three times a week or daily.

The peptides and the peptide dimers of the present invention, their stereoisomers, mixtures thereof and/or their pharmaceutically acceptable salts, can also be incorporated into delivery systems and/or pharmaceutical sustained release systems.

The pharmaceutical composition of the present invention can comprise at least one pharmaceutically acceptable excipient and/or adjuvant. The number and nature of the pharmaceutically acceptable excipients depend on the administration method desired. Pharmaceutically acceptable excipients are well known by experts in the field [Rowe R. C., Sheskey P. J., Quinn, M. E. (2009) "Handbook of Pharmaceutical Excipients, 6th Edition", Pharmaceutical Press and American Pharmacists Association]. Said compositions may be prepared using the conventional methods that are known in the state of the art.

The terms "delivery system" and its plural relate to a diluent, adjuvant excipient or carrier with which the peptide or peptide dimer of the present invention is administered. These pharmaceutical carriers can be liquids, such as water, oils or surfactants, including those of petroleum, animal, plant or synthetic origin, for example and not restricted to, peanut oil, soybean oil, mineral oil, sesame oil, castor oil, polysorbates, sorbitan esters, ether sulfates, sulfates, betaines, glycosides, maltosides, fatty alcohols, nonoxynols, poloxamers, polyoxyethylenes, polyethylene glycols, dextrose, glycerol, digitonin and such. A person skilled in the art knows the diluents, adjuvants or excipients which can be used in the different delivery systems in which the peptides and peptide dimers of the present invention can be administered.

The term "sustained release" is used in a conventional sense referring to a delivery system of a compound which provides the gradual release of said compound during a period of time and preferably, although not necessarily, with relatively constant compound release levels over a period of time.

Examples of delivery or sustained release systems include, without restriction, liposomes, mixed liposomes, oleosomes, niosomes, ethosomes, milliparticles, microparticles, nanoparticles and solid lipid nanoparticles, nanostructured lipid carriers, sponges, cyclodextrins, vesicles, micelles, mixed micelles of surfactants, surfactant-phospholipid mixed micelles, millispheres, microspheres and nanospheres, lipospheres, millicapsules, microcapsules and nanocapsules, as well as microemulsions and nanoemulsions, which can be added to achieve a greater bioavailability of the active principle and/or improve its pharmacokinetic and pharmacodynamic properties.

The pharmaceutical compositions of the peptides and the peptide dimers of the present invention, their stereoisomers, mixtures thereof, and/or their pharmaceutically acceptable salts can be administered by any appropriate route, for which the pharmaceutically acceptable excipients necessary for the formulation of the administration form desired will be included, by local or systematic application, for example and not limited to, topical, enteral or parenteral route. In the context of this invention, the term "topical" route includes dermal and ophthalmic routes, the term "enteral" route includes administration to the digestive system such as oral, buccal, gastric, sublingual and rectal routes and the term "parenteral" refers to nasal, auricular, ophthalmic, rectal, urethral, vaginal, subcutaneous, intradermal, intravascular injections such as intravenous, intramuscular, intraocular, intraspinal, intracranial, intracervical, intracerebral, intrameningeal, intraarticular, intrahepatic, intrathoracic, intratracheal, intrathecal and intraperitoneal, and any another similar injection or infusion technique. Treatment in vitro is also considered, for example, in damaged cells cultures and/or stem cells and the ex vivo treatment.

More specifically, the treatment with the peptides, peptide dimers and compositions of this invention, is carried out in vivo as the preferred administration route is subcutaneous.

The pharmaceutical compositions of the peptides and peptide dimers of the present invention, their stereoisomers, mixtures thereof, and/or their pharmaceutically acceptable salts can be administered in a combined therapy with other therapeutic agents and/or therapeutic treatments. Preferably, the therapeutic agents and/or therapeutic treatments are anticancer agents and/or treatments.

Uses

Regarding another aspect, this invention refers to a peptide or a peptide dimer of the present invention, its stereoisomers, mixtures thereof and/or its pharmaceutically acceptable salts, or a pharmaceutical composition of the present invention for use as a medicament.

Another aspect of this invention refers to a peptide or a peptide dimer of the present invention, its stereoisomers, mixtures thereof and/or its pharmaceutically acceptable salts, or a pharmaceutical composition of the present invention for use in the treatment and/or diagnosis of cancer and/or metastasis. Specifically, the peptides and the peptide dimers of the present invention are able to inhibit cancer growth and/or reduce or inhibit cancer cell invasion and metastasis in different cancers.

The present invention relates to a method of treatment and/or diagnosis of cancer and/or metastasis, which comprises the administration of a pharmaceutically effective amount of a peptide or a peptide dimer of the present invention, its stereoisomers, mixtures thereof and/or its pharmaceutically acceptable salts, or of a pharmaceutical composition of the present invention, to an individual in need thereof (preferably, a human being).

The present invention relates to the use of a peptide or a peptide dimer of the present invention, its stereoisomers, mixtures thereof and/or its pharmaceutically acceptable salts, or a pharmaceutical composition of the present invention for the manufacture of a medicament.

The present invention relates to the use of a peptide or a peptide dimer of the present invention, its stereoisomers, mixtures thereof and/or its pharmaceutically acceptable salts, or of a pharmaceutical composition of the present invention for the manufacture of a medicament for the diagnosis and/or treatment of cancer and/or metastasis.

In an embodiment, the present invention relates to the use of a peptide or a peptide dimer of the present invention, its stereoisomers, mixtures thereof and/or its pharmaceutically acceptable salts, or of a pharmaceutical composition of the present invention in the diagnosis of cancer and/or metastasis, said diagnosis being performed in the absence of the human body. This is, said diagnosis, being in vitro.

Therefore, in a preferred aspect the present invention refers to an in vitro diagnostic method of cancer and/or metastasis which comprises the use of a peptide or a peptide dimer of the present invention, its stereoisomers, mixtures thereof and/or its pharmaceutically acceptable salts, or of a pharmaceutical composition of the present invention.

Cancer and/or metastasis include, but are not limited to, neuroblastoma, sarcomas, soft tissue sarcomas such as rhabdomyosarcoma (including the embryonal, alveolar, pleomorphic, and spindle cell/sclerosing), intimal sarcoma, undifferentiated spindle cell sarcoma, undifferentiated pleomorphic sarcoma, undifferentiated round cell sarcoma, undifferentiated epithelioid sarcoma, liposarcoma, atypical lipomatous tumour, malignant solitary fibrous tumour, inflammatory myofibroblastic tumour, low-grade myofibroblastic sarcoma, fibrosarcoma (including adult and sclerosing epithelioid varieties), myxofibrosarcoma, low-grade fibromyxoid sarcoma, giant cell tumour of soft tissues, leiomyosarcoma, malignant *glomus* tumour, hemangioendothelioma (including retiform, pseudomyogenic and epithelioid), angiosarcoma of soft tissue, extraskeletal osteosarcoma, malignant gastrointestinal stromal tumour (GIST), malignant peripheral nerve sheath tumour (including epithelioid variety), malignant Triton tumour, malignant granular cell tumour, malignant ossifying fibromyxoid tumour, stromal sarcoma, myoepithelial carcinoma, malignant phosphaturic mesenchymal tumour, synovial sarcoma (including spindle cell and biphasic), epithelioid sarcoma, alveolar soft part sarcoma, clear cell sarcoma of soft tissue, extraskeletal myxoid chondrosarcoma, extraskeletal Ewing sarcoma, desmoplastic small round cell tumour, extrarenal rhabdoid tumour, perivascular epithelioid cell tumour, bone sarcomas such as osteosarcoma, chondrosarcoma and Ewing sarcoma, hemangioendothelioma, angiosarcoma, fibrosarcoma and myofibrosarcoma, chordoma, adamantinoma, breast cancer (such as ductal, lobular, and nipple carcinoma), colon cancer, rectum cancer, anal cancer, colorectal cancer, brain cancer such as glioblastoma, astrocytoma or medulloblastoma, malignant gliomas, prostate cancer, melanoma and other skin cancers, cervical cancer, uterine cancer, ovarian cancer (such as high-grade serous ovarian carcinoma), endometrial cancer, lymphomas, head and neck cancer, oral cancer, salivary gland carcinoma, retinoblastoma, gastrointestinal cancer, esophageal cancer, stomach cancer, pancreatic cancer, gallbladder cancer, liver cancer (such as hepatocellular carcinoma, HCC), kidney or renal cancer such as Wilm's tumour or nephroblastoma, bladder cancer, lung cancer such as small cell lung cancer and non-small cell lung cancer, non-Hodgkin's lymphoma, multiple myeloma, pituitary adenomas, squamous cell carcinoma, testicular cancer, leukemia (such as acute lymphocytic leukemia, chronic lymphocytic leukemia, acute myelogenous leukemia, and chronic myelogenous leukemia), plasmacytoma or multiple myeloma. Preferably, the cancer and/or metastasis is selected from neuroblastoma, rhabdomyosarcoma or breast cancer.

To allow a better understanding, the present invention is described in more detail below with reference to the enclosed drawings, which are presented by way of example, and with reference to illustrative and non-limitative examples.

EXAMPLES

Figure 1:
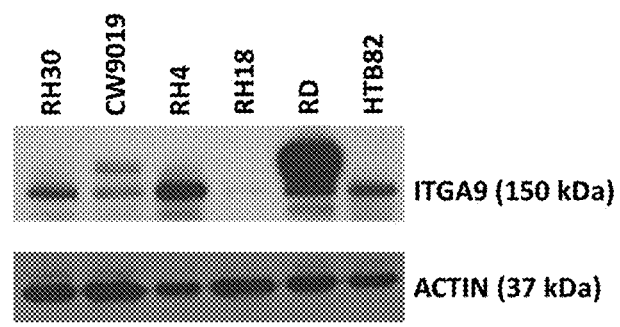
FIG. 1. Western blot image showing the expression of ITGA9 in 6 rhabdomyosarcoma cell lines. Actin was used as control.

The following specific examples provided in this patent document serve to illustrate the nature of the present invention. These examples are included only for illustrative purposes and should not be interpreted as being limitations to the invention claimed herein.

Abbreviations

The abbreviations used in the present description have the following meanings: AC₂O, Acetic anhydride; ACN, Acetonitrile; AcOH, Acetic acid; Boc, tert-butyloxycarbonyl; DCM, Dichloromethane; DMEM, Dulbecco's modified Eagle's medium; DIEA, N,N'-diisopropylethylamine; DIPCDI, Diisopropylcarbodiimide; DMF, N, N-dimethylformamide; Et₂O, Diethyl Ether; eq, equivalent; ESI-MS, Electrospray Ionization Mass Spectrometry; Et₂O, Diethyl ether; Fmoc, 9-fluorenylmethyloxycarbonyl; HOBT, N-hydroxybenzotriazole; HPLC, high performance liquid chromatography; ITGA9, Integrin α9β1; i.v., intravenous; p-MBHA resin, 4-Methylbenzhydrylamine resin; MeOH, Methanol; MW, molecular mass; μL, microlitre; PBS, Phosphate buffered saline; RP-HPLC, Reverse Phase HPLC; rpm, revolutions-per-minute; s.c., subcutaneous; tBu, tert-butyl; TFA, trifluoroacetic acid; TIS, triisopropylsilane; TIO, thioanisole; tr, retention time; Trt, trityl.

Example 1. Synthesis of Peptides and Peptide Dimers

```
Ac-SEQ ID NO: 10-NH₂:
Ac-Arg-Asp-Ser-Ser-Asn-Ser-Cys-

Asp-Leu-Pro-Glu-Phe-NH₂

Ac-SEQ ID NO: 3-NH₂:
Ac-Arg-Asp-Ser-Ser-Asn-Ser-Cys-

Asp-Leu-Pro-Glu-Msa-NH₂

Octanoyl-SEQ ID NO: 3-NH₂:
Octanoyl-Arg-Asp-Ser-Ser-

Asn-Ser-Cys-Asp-Leu-Pro-Glu-Msa-NH₂

SEQ ID NO: 4-NH₂:
Pyr-Arg-Asp-Ser-Ser-Asn-Ser-Cys-

Asp-Leu-Pro-Glu-Msa-NH₂

Ac-SEQ ID NO: 5-NH₂:
Ac-Lys-Arg-Asp-Ser-Ser-Asn-Ser-

Cys-Asp-Leu-Pro-Glu-Msa-Lys-NH₂

Octanoyl-SEQ ID NO: 5-NH₂:
Octanoyl-Lys-Arg-Asp-Ser-Ser-Asn-

Ser-Cys-Asp-Leu-Pro-Glu-Msa-Lys-NH₂
```

```
SEQ ID NO: 6-NH₂:
Pyr-Lys-Arg-Asp-Ser-Ser-Asn-Ser-

Cys-Asp-Leu-Pro-Glu-Msa-Lys-NH₂

SEQ ID NO: 7-NH₂:
Pyr-Lys-Arg-Asp-Ser-Ser-Asn-Ser-

Met-Asp-Leu-Pro-Glu-Msa-Lys-NH₂

(SEQ ID NO: 6-NH₂)₂ (disulfide bridge):
(Pyr-Lys-Arg-Asp-Ser-Ser-Asn-Ser-Cys-

Asp-Leu-Pro-Glu-Msa-Lys-NH₂)₂
(disulfide bridge)

Octanoyl-SEQ ID NO: 8-NH₂:
Octanoyl-Lys-Arg-Asp-Ser-Ser-Asn-Ser-

Met-Asp-Leu-Pro-Glu-Msa-Lys-NH₂

SEQ ID NO: 9-NH₂:
Pyr-Lys-Arg-Asp-Ser-Ser-Asn-Ser-Cys (Cys)-Asp-Leu-Pro-Glu-Msa-Lys-NH₂
```

Solid phase peptide synthesis was used for the synthesis of the peptides. The peptide Ac-SEQ ID NO: 10—NH₂, a 12 amino acid sequence comprised within the native disintegrin domain of ADAM-12, and specifically comprised within SEQ ID NO: 2, was also synthesized as a control compound.

All peptides were synthesized manually or with an automatic Peptide synthesizer (Liberty, CEM) by solid-phase peptide synthesis following the standard Fmoc/tBu strategy with 4-Methylbenzhydrylamine resin (p-MBHA) at different scales (between 0.3 and 30 mmol). For each sequence, the resin was placed in a proper reaction vessel equipped with a filter plate. The Fmoc-AM-OH linker (2 eq) and HOBT (2 eq) were dissolved in DMF:DCM (1:1) stirred till dissolution and then DIPCDI (2 eq.) was added. The solution was transferred into the reactor and left to react for 40-60 minutes. The incorporation of the linker was controlled by the Ninhydrine test. If the Ninhydrine test was positive, a reactivation or a re-coupling step was carried out until the coupling was completed.

Once the coupling was completed, synthesis proceeded with the removal of the Fmoc group by treatment with a solution of 20% piperidine in DMF (twice for 5 minutes and twice for 10 minutes). The peptide-resin was washed 5 times with DMF, filtered, the washings were discarded, and the following amino acids were coupled. Couplings were done by using Fmoc-AA-OH: DIPCDI: HOBt (3 eq:3 eq:3 eq) in DMF (Fmoc-Msa-OH was coupled using 1.5 eq. All these coupling reactions were left to react for 40-60 minutes. The completion of each coupling reaction was controlled with a Ninhydrine test (or Chloranyl when the coupling was over the secondary amine of Proline). A re-activation or re-coupling step was done when needed. Synthesis carried out with the automatic synthesizer were not controlled by Ninhydrin test neither by the Chloranyl. At the end of the synthesis, acetylation was carried out when needed by using AC₂O (2.5 eq) with DIEA (5 eq) in DMF. For those sequences which had an N-terminal Octanoyl, 5 eq of Octanoic acid, HOBT and DIPCDI were used for the acylation. After completion of the peptide sequence, peptidyl-resins were washed with DMF, MeOH and Et₂O and dried.

After the synthesis, peptide cleavage was carried out following the procedure described below. The peptidyl-resin was left to react between 2 and 4 hours in a suitable TFA mixture (see Table 2 below) at room temperature. The resin was washed with TFA and Et₂O. All the filtrates were plunged into cold ether 81:7, (v: v) and left to rest for 15-30 minutes. The suspension obtained was filtered through a filter plate and the filters discarded. The residue was washed with ether and the filters from each wash were discarded. The solid was freeze dried and the peptide crude product obtained. The following table (Table 2) shows the TFA cocktails used for the different peptides and peptide dimer.

TABLE 2

TFA cocktails used for the different peptides and peptide dimer synthesized in Example 1.

| Peptide ID | TFA cocktail (w:v) |
|---|---|
| Ac-SEQ ID NO: 10-$NH_2$ | TFA:Dodecanethiol:TIO:TIS:$H_2O$ (75:10:5:5:5) or TFA:$H_2O$ (80:20) |
| Ac-SEQ ID NO: 3-$NH_2$ | TFA:Dodecanethiol (80:20) |
| Octanoyl-SEQ ID NO: 3-$NH_2$ | TFA:Dodecanethiol (80:20) |
| SEQ ID NO: 4-$NH_2$ | TFA:Dodecanethiol (80:20) |
| Ac-SEQ ID NO: 5-$NH_2$ | TFA:Dodecanethiol (80:20) |
| Octanoyl-SEQ ID NO: 5-$NH_2$ | TFA:Dodecanethiol (80:20) |
| SEQ ID NO: 6-$NH_2$ | TFA:TIO:TIS:$H_2O$ (85:5:5:5) |
| SEQ ID NO: 7-$NH_2$ | TFA:TIO:TIS:$H_2O$ (85:5:5:5) |
| (SEQ ID NO: 6-$NH_2$)$_2$ (disulfide bridge) | TFA:Dodecanethiol:TIO:TIS:$H_2O$ (75:10:5:5:5) |
| Octanoyl-SEQ ID NO: 8-$NH_2$ | TFA:Dodecanethiol:TIO:TIS:$H_2O$ (75:10:5:5:5) |

The peptide dimer (SEQ ID NO: 6—$NH_2$)$_2$ (disulfide bridge) was obtained by oxidising 20 mg of peptide SEQ ID NO: 6—$NH_2$ at a concentration of 10 mg/mL in 15% DMSO in 10% 5 AcOH in water for 48-72 hours and then recovered by using a Sep pack $C_{18}$ cartridge (Waters). The peptide dimer was retained in the $C_{18}$ column and then recovered with a mixture of water:acetonitrile (80:20) and lyophilised obtaining 17 mg of the peptide dimer (SEQ ID NO: 6—$NH_2$)$_2$ (disulfide bridge) (81% yield).

Crude peptides and peptide dimer were purified in a semi-preparative system equipped 10 with a NW50 column filled with 10 micrometers Kromasil silica and the pure fractions analysed in an analytical RP-HPLC were lyophilised.

The following table (Table 3) indicates scale of the synthesis, yield of crude and pure peptide and MW for each compound.

TABLE 3

Scale of the synthesis, yield of crude and pure peptide and MW for each of the peptides and peptide dimer synthesized in Example 1.

| Peptide ID | Scale | Peptidyl-resin | Crude peptide | Pure peptide | MW |
|---|---|---|---|---|---|
| Ac-SEQ ID NO: 10-$NH_2$ | 1.20 mmol* | 3.92 g | 1.26 g | 0.27 g | 1410 |
| Ac-SEQ ID NO: 3-$NH_2$ | 0.40 mmol* | 1.27 g | 0.26 g | — | 1452 |
| Octanoyl-SEQ ID NO: 3-$NH_2$ | 0.40 mmol* | 1.38 g | 0.40 g | — | 1537 |
| SEQ ID NO: 4-$NH_2$ | 0.40 mmol* | 1.41 g | 0.42 g | — | 1522 |
| Ac-SEQ ID NO: 5-$NH_2$ | 0.40 mmol* | 1.40 g | 0.28 g | 0.09 g | 1708 |
| Octanoyl-SEQ ID NO: 5-$NH_2$ | 0.40 mmol* | 1.62 g | 0.34 g | 0.09 g | 1793 |
| SEQ ID NO: 6-$NH_2$ | 3.60 mmol | 14.36 g | 5.91 g | 1.24 g | 1778 |
| SEQ ID NO: 7-$NH_2$ | 28.8 mmol | 92.59 g | 48.5 g | 13.4 g | 1806 |
| (SEQ ID NO: 6-$NH_2$)$_2$ (disulfide bridge) | — | — | 20 mg | 17 mg | 3554 |
| Octanoyl-SEQ ID NO: 8-$NH_2$ | 6.0 mmol | 15.3 g | 5.6 g | 1.6 g | 1820 |

*Synthesis carried out using the Liberty (CEM) automatic Synthesizer

The ion-exchange step was carried out as follows. The lyophilised pure compounds were dissolved in a mixture of AcOH. The acetic acid solution containing them was then treated with DOWEX resin to get the peptide or peptide dimer with the acetate counterion. The final acetate compound was recovered via filtering and lyophilised.

The peptides and peptide dimer were characterised by Mass Spectrometry in an ESI-MS equipment as shown in the table (Table 4) below.

TABLE 4

Mass Spectrometry results obtained for the peptides and peptide dimer synthesized in Example 1.

| Peptide ID | MW (u.m.a.) |
|---|---|
| Ac-SEQ ID NO: 10-$NH_2$ | 1410 |
| Ac-SEQ ID NO: 3-$NH_2$ | 1452 |
| Octanoyl-SEQ ID NO: 3-$NH_2$ | 1537 |
| SEQ ID NO: 4-$NH_2$ | 1522 |
| Ac-SEQ ID NO: 5-$NH_2$ | 1708 |
| Octanoyl-SEQ ID NO: 5-$NH_2$ | 1793 |
| SEQ ID NO: 6-$NH_2$ | 1778 |
| SEQ ID NO: 7-$NH_2$ | 1806 |
| (SEQ ID NO: 6-$NH_2$)$_2$ (disulfide bridge) | 3554 |
| Octanoyl-SEQ ID NO: 8-$NH_2$ | 1820 |

Example 2. In Vitro Stability. Determination of Half-Life (t1/2) of the Peptides and Peptide Dimer in Human Plasma The peptides and peptide dimer synthesized and prepared in accordance with Example 1 were dissolved in water at a concentration of 6 mg/mL and warmed up to 37° C.

Human plasma was obtained as a lyophilized solid (K3 EDTA Plasma, BBI Solutions, code S112-1), reconstituted with sterile 0.9% sodium chloride solution and stored at −20° C. Human plasma was thawed and incubated at 37° C. before use.

The peptides and peptide dimer were incubated in 90% human plasma at 37° C. for different times and then precipitated with two volume equivalents of methanol. The samples were cooled in an acetone-carbon dioxide bath for a few seconds and centrifuged for 12 minutes at 4° C. at approximately 10,000 rpm. The supernatant was filtered with a 0.45 μm PVDF filter and analyzed in triplicate by RP-HPLC using an isocratic method (Eluent A=0.1% TFA in water; Eluent B=0.07% TFA in ACN, Column=Kromasil C8, 100 Å, 5 μm, 250×4.6 mm, Flow=1 mL/min, Wavelength: 220 nm, Injection volume=20 μL, Temperature=60°

C.). The disappearance of the compound was determined in relation to the area of the initial time to calculate its half-life.

The following table (Table 5) shows the t1/2 data for the peptides and peptide dimer.

TABLE 5 t½ data obtained for the peptides and peptide dimer studied in Example 2.

| Peptide ID | t½ (hours) in human plasma |
|---|---|
| Ac-SEQ ID NO: 10-NH$_2$ | 0.32 |
| Ac-SEQ ID NO: 5-NH$_2$ | 0.23 |
| Octanoyl-SEQ ID NO: 5-NH$_2$ | 0.15 |
| SEQ ID NO: 6-NH$_2$ | 0.17 |
| SEQ ID NO: 7-NH$_2$ | 40.5 |
| (SEQ ID NO: 6-NH$_2$)$_2$ | 33.1 |
| Octanoyl-SEQ ID NO: 8-NH$_2$ | 3.6 |

Example 3. Integrin α9β1 (ITGA9) Protein Levels. Evaluation of ITGA9 Protein Expression by Western Blot Rhabdomyosarcoma cell lines RH30, CW9019, RH4, RH18, RD and HTB82 were cultured in Minimum Essential Medium with Earle's Salts (Biowest) supplemented with 10% of fetal bovine serum (FBS) (Sigma-Aldrich), 2 mM L-glutamine, 1 mM sodium pyruvate, 1x non-essential amino acids, 100 U/mL penicillin and 0.1 mg/mL streptomycin (all reagents from Biowest). Neuroblastoma cell lines CHLA-90, BE(2)-C and SK—N-BE(2)-C were grown in Iscove's Modified Dulbecco's Medium (Thermo Fisher Scientific) supplemented with 10% FBS (Sigma-Aldrich), 1% insulin-transferrin-selenium G supplement (Thermo Fisher Scientific), 100 U/mL penicillin and 0.1 mg/mL streptomycin (Biowest). Breast cancer cell lines MDA-MB-231, MDA-MB-468 MCF7, T47D, BT474 and MCF10A were cultured in Dulbecco's Modified Eagle Medium (Thermo Fisher Scientific) supplemented with 10% FBS (Sigma), 1x non-essential amino acids, 100U/ml penicillin and 0.1 mg/ml streptomycin (all reagents from Biowest). All cell lines were maintained at 37° C. in a controlled atmosphere of 5% CO$_2$.

At 80%-confluence, cells were washed with PBS and scraped in RIPA protein lysis buffer (Thermo Fisher Scientific) supplemented with protease inhibitors (Roche) and phosphatase inhibitors (Sigma). Cell lysates were incubated for 5 minutes at 95° C. After centrifugation at 13000 rpm for 15 min at 4° C., cell debris was discarded. Supernatant protein concentration was quantified by DC Protein Assay (Bio-Rad Laboratories), according to the manufacturer's instructions.

Proteins were separated by 8% SDS-PAGE (sodium dodecyl sulfate polyacrylamide gel electrophoresis) and transferred onto PVDF (Polyvinylidene fluoride) membranes (GE Healthcare). After blocking with 5% BSA (Bovine serum albumin) in TBS-T (tris-buffered saline-tween) for 1 hour, membranes were incubated overnight with primary antibodies dilution at 4° C. The antibodies were the following: anti-α9-Integrin monoclonal antibody clone 3E4 (Novus Biologicals) diluted 1:1000, anti-FAK (Cell Signaling) diluted 1:1000, anti-Phospho-FAK at Tyr397 (Cell Signaling) diluted 1:1000 and anti-actin (Santa Cruz Biotechnology) diluted 1:10000. After washing with TBS-T, membranes were incubated with the corresponding peroxidase-conjugated secondary antibody for 1 hour at room temperature. Immunoreactive bands were visualized with ECL prime chemiluminescence detection reagent (GE Healthcare).

Figure 2:
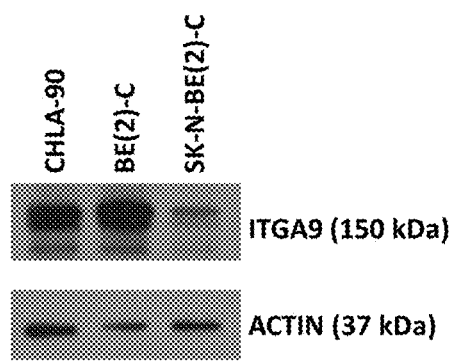
FIG. 2. Western blot image showing the expression of ITGA9 in 3 neuroblastoma cell lines. Actin was used as control.
Figure 3:
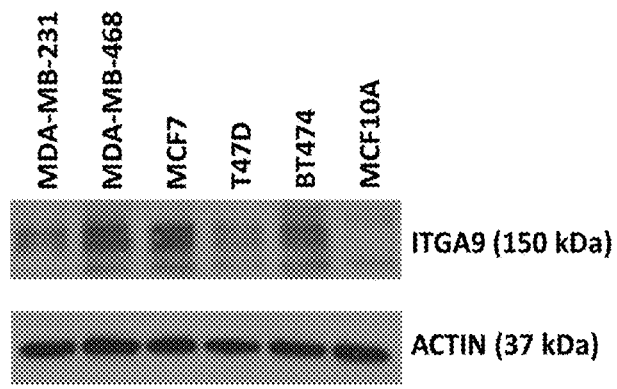
FIG. 3: Western blot image showing the expression of ITGA9 in 6 different breast cancer cell lines. Actin was used as control.

As shown in the Western blot images of FIGS. 1, 2 and 3, the expression of ITGA9 is higher in RD than in RH30 cells, in BE(2)-C and CHLA-90 cells than in SK—N-BE(2)-C cells and it is also higher in MDA-MB-468 cells among the rest of breast cancer cells lines evaluated.

Example 4. Determination of Invasiveness In Vitro in Rhabdomyosarcoma Cell Lines (RH30 and RD)

$10^5$ RH30 or RD cells were plated in the upper chamber of a Matrigel-coated transwell (Corning) in 0.1 mL medium without FBS. Cells were previously incubated with different concentrations (0 nM, 100 nM, 200 nM, 500 nM and 1000 nM) of the peptides and peptide dimer for 48 hours, being also present in the medium during the cell invasion assay. In the lower chamber, 0.6 mL of medium with FBS was added. Cells were incubated at 37° ° C. for 24 hours.

After that, cells were fixed with 4% paraformaldehyde (Sigma) for 10 minutes, followed by washing with PBS. After removal of the Matrigel and remaining cells from the upper face of the membrane with a cotton swab, the cells present on the lower face were stained with a Hoechst dilution (Sigma) and were counted (5 fields for each well) with an inverted fluorescence microscope Nikon with a 10× objective. All experiments were made in triplicate. In Table 6 the % Invasiveness represents the mean percentage of invasive cells with respect to their controls.

TABLE 6

Percentage of invasiveness of rhabdomyosarcoma cell lines (RH30 and RD) in the absence and presence of the peptides and peptide dimer at different concentrations from 100 till 1000 nM assessed by transwell assay.

| | | % Invasiveness Rhabdomyosarcoma cells | | | |
|---|---|---|---|---|---|
| | Concentration | RH30 | | RD | |
| Peptide ID | (nM) | % | SD | % | SD |
| Ac-SEQ ID NO: 10-NH$_2$ | 0 nM | 100.00 | 25.18 | 100.00 | 21.36 |
| | 100 nM | 83.91 | 47.87 | 106.77 | 29.04 |
| | 500 nM | 113.68 | 44.31 | 59.90 | 13.22 |
| Ac-SEQ ID NO: 5-NH$_2$ | 0 nM | 100.00 | 30.82 | 100.00 | 43.49 |
| | 100 nM | 24.83* | 21.06 | 100.80 | 32.28 |
| | 500 nM | 18.49* | 4.95 | 35.59 | 45.86 |
| Octanoyl-SEQ ID NO: 5-NH$_2$ | 0 nM | 100.00 | 19.31 | 100.00 | 9.92 |
| | 100 nM | 120.81 | 34.37 | 56.90 | 27.23 |
| | 500 nM | 41.12* | 20.57 | 14.16* | 0.86 |
| SEQ ID NO: 6-NH$_2$ | 0 nM | 100.00 | 45.60 | 100.00 | 42.55 |
| | 100 nM | 54.67 | 34.59 | 39.45 | 2.48 |
| | 500 nM | 22.77* | 13.02 | 39.98 | 8.43 |
| SEQ ID NO: 7-NH$_2$ | 0 nM | 100.00 | 23.12 | 100.00 | 13.13 |
| | 100 nM | 121.38 | 9.11 | 30.82* | 19.04 |
| | 200 nM | 77.38 | 4.36 | 22.94* | 12.77 |
| | 500 nM | 65.59 | 10.46 | 17.60* | 18.21 |
| | 1000 nM | 63.23 | 22.96 | 19.68* | 17.63 |
| (SEQ ID NO: 6-NH$_2$)$_2$ (disulfide bridge) | 0 nM | 100.00 | 2.77 | 100.00 | 18.51 |
| | 100 nM | 82.46* | 1.31 | n.d. | n.d. |
| | 200 nM | 70.84* | 8.33 | n.d. | n.d. |
| | 500 nM | 78.26* | 5.61 | 64.71 | 14.41 |
| | 1000 nM | 57.59* | 1.71 | 25.36* | 17.09 |

TABLE 6-continued

Percentage of invasiveness of rhabdomyosarcoma cell lines
(RH30 and RD) in the absence and presence of the peptides
and peptide dimer at different concentrations from 100
till 1000 nM assessed by transwell assay.

| | | % Invasiveness Rhabdomyosarcoma cells | | | |
|---|---|---|---|---|---|
| | Concentration | RH30 | | RD | |
| Peptide ID | (nM) | % | SD | % | SD |
| Octanoyl-SEQ ID NO: 8-NH$_2$ | 0 nM | 100.00 | 14.91 | 100.00 | 12.21 |
| | 100 nM | 88.38 | 12.78 | 75.55 | 15.34 |
| | 200 nM | 99.30 | 12.08 | 113.22 | 11.77 |
| | 500 nM | 71.92 | 10.94 | 63.27 | 13.83 |
| | 1000 nM | 74.06 | 32.49 | 15.89* | 18.65 | n.d: not determined
*p-value < 0.05 in comparison with non-treated cells

All peptide analogues provoked a significant reduction on the percentage of invasiveness (% invasiveness) of RH30 and/or RD rhabdomyosarcoma cells in relation to non-treated cells, reaching significance at different concentrations of peptide analogue. Ac-SEQ ID NO: 5—NH$_2$ and (SEQ ID NO: 6—NH$_2$)$_2$ showed a significant reduction in % invasiveness of RH30 cells at a peptide concentration of 100 nM and Octanoyl-SEQ ID NO: 5—NH$_2$ and SEQ ID NO: 6—NH$_2$ showed a significant reduction at 500 nM. The significant decrease in % invasiveness of RD cells was observed with Octanoyl-SEQ ID NO: 5—NH$_2$ treatment at 500 nM concentration and (SEQ ID NO: 6—NH$_2$)$_2$ and Octanoyl-SEQ ID NO: 8—NH$_2$ treatment at 1 μM concentration. SEQ ID NO: 7—NH$_2$ showed a significant effect on RD cells invasiveness, with an invasiveness below 50% even at the lowest dose (100 nM). Its effect in the RH30 cell line, which presented low ITGA9 expression, was more moderate, diminishing % invasiveness without reaching significance.

Example 5. Determination of Invasiveness In Vitro in Neuroblastoma Cell Lines (CHLA-90 and BE(2)-C)

The transwell assay with CHLA-90 and BE(2)-C cell lines was done following the same conditions detailed for determining the % of invasiveness in rhabdomyosarcoma cells.

As observed in Table 7, the neuroblastoma cell lines also showed sensitivity to the peptide SEQ ID NO: 6—NH$_2$, reaching significant reductions in % invasiveness for both cell lines CHLA-90 and BE(2)-C at concentrations from 200 nM and 500 nM, respectively.

TABLE 7

Percentage of invasiveness of neuroblastoma cell lines
(CHLA-90 and BE(2)-C) in the absence or presence of the peptide
SEQ ID NO: 6-NH$_2$ at different concentrations (from 100
till 1000 nM) assessed by transwell assay.

| | | % Invasiveness Neuroblastoma cells | | | |
|---|---|---|---|---|---|
| | Concentration | CHLA-90 | | BE(2)-C | |
| Peptide ID | (nM) | % | SD | % | SD |
| SEQ ID NO: 6-NH$_2$ | 0 nM | 100.00 | 19.36 | 100 | 21.57 |
| | 100 nM | 75.90 | 9.37 | 60.08 | 13.08 |
| | 200 nM | 55.22* | 19.13 | 59.04 | 13.45 |
| | 500 nM | 44.58* | 13.63 | 31.17* | 20.19 |
| | 1000 nM | 49.00* | 5.59 | 23.54* | 6.31 |

*p-value < 0.05 in comparison with non-treated cells

Example 6. Results of Peptide SEQ ID NO: 7—NH$_2$ on Invasiveness In Vitro in Neuroblastoma Cells (CHLA-90, BE(2)-C and SK—N-BE(2)-C) and Breast Cancer Cell Lines (MDA-MB-231 and MDA-MB-468)

The transwell assay with neuroblastoma cell lines (CHLA-90, BE(2)-C and SK—N-BE(2)-C)) and breast cancer cell lines (MDA-MB-231 and MDA-MB-468) was performed at the same conditions detailed for determining the % of invasiveness in rhabdomyosarcoma cells.

As shown in Table 8, the neuroblastoma cell lines CHLA-90 and BE(2)-C also showed sensitivity to the peptide SEQ ID NO: 7—NH$_2$, with significant reduction in cell invasiveness. Further invasiveness studies with this peptide in a third neuroblastoma cell line showed that the treatment was also efficacious in inhibiting invasiveness at 500 nM concentration in SK—N-BE(2)-C cell line, which does not overexpress ITGA9. In breast cancer cell lines, the cell line MDA-MB-468 showed a clear reduction of invasiveness under treatment, while the cell line MDA-MB-231 (with low ITGA9 expression) showed a moderate reduction at the highest treatment dose (not statistically significant).

TABLE 8

Percentage of invasiveness of neuroblastoma cell lines (CHLA-90, BE(2)-C and SK-N-BE(2)-C)
and breast cancer cell lines (MDA-MB-231 and MBA-MB-468) in the absence or presence
of the peptide SEQ ID NO: 7-NH$_2$ at different concentrations assessed by transwell assay.

| | Peptide SEQ ID NO: 7-NH$_2$ | | | | | | | | | |
|---|---|---|---|---|---|---|---|---|---|---|
| | Neuroblastoma | | | | | | Breast cancer | | | |
| Concentration | CHLA-90 | | BE(2)-C | | SK-N-BE(2)-C | | MDA-MB-231 | | MDA-MB-468 | |
| (nM) | % | SD | % | SD | % | SD | % | SD | % | SD |
| 0 nM | 100.00 | 27.23 | 100.00 | 0.00 | 100.00 | 12.22 | 100.00 | 8.90 | 100.00 | 12.32 |
| 100 nM | 94.31 | 7.96 | 95.15 | 10.03 | 84.35 | 23.40 | 111.82 | 4.79 | 96.71 | 1.80 |

TABLE 8-continued

Percentage of invasiveness of neuroblastoma cell lines (CHLA-90, BE(2)-C and SK-N-BE(2)-C) and breast cancer cell lines (MDA-MB-231 and MBA-MB-468) in the absence or presence of the peptide SEQ ID NO: 7-NH$_2$ at different concentrations assessed by transwell assay.

| | Peptide SEQ ID NO: 7-NH$_2$ | | | | | | | | | |
|---|---|---|---|---|---|---|---|---|---|---|
| | Neuroblastoma | | | | | | Breast cancer | | | |
| Concentration | CHLA-90 | | BE(2)-C | | SK-N-BE(2)-C | | MDA-MB-231 | | MDA-MB-468 | |
| (nM) | % | SD | % | SD | % | SD | % | SD | % | SD |
| 200 nM | 52.37 | 11.62 | 60.70* | 9.62 | 91.84 | 7.44 | 109.71 | 21.39 | 57.65 | 11.83 |
| 500 nM | 38.94 | 35.14 | 56.72* | 16.42 | 73.31* | 4.16 | 99.97 | 8.57 | 54.53* | 5.63 |
| 1000 nM | 20.37* | 14.16 | 33.21* | 4.75 | 52.70* | 10.47 | 53.69 | 20.01 | 48.39* | 18.35 |

Overall, these results do not point to a unique correlation between higher ITGA9 expression level and better efficacy of the peptide SEQ ID NO: 7—NH$_2$ in reducing invasiveness. Thus, the interaction with ITGA9 must not be the only molecular mechanism by which the peptide analogues show efficacy, because, for example, SEQ ID NO: 7—NH$_2$ at 500 nM concentration caused a significant reduction in SK-N-BE(2)-C invasiveness, a cell line with low ITGA9 expression level.

Example 7. Invasiveness In Vivo in a Rhabdomyosarcoma Metastatic Mice Model

SCID/Beige female mice aged of 5 weeks were administered subcutaneously (s.c.) at day −1 with the first dose of treatment i.e. the vehicle (PBS, Phosphate buffered saline) or the peptides. On day 0, mice were injected intravenously (i.v.) in the tail vein with 2×10$^6$ RD rhabdomyosarcoma cells. Afterwards, mice were treated s.c. three times per week (every 2-3 days) for 27 weeks with vehicle PBS (n=9); SEQ ID NO: 6—NH$_2$ 0.5 mg/kg (n=6); SEQ ID NO: 6—NH$_2$ 2 mg/kg (n=7); SEQ ID NO: 7—NH$_2$ 0.5 mg/kg (n=6) and SEQ ID NO: 7—NH$_2$ 2 mg/kg (n=7).

Body weight was evaluated twice per week for 27 weeks. Overall survival and event-free survival were determined. At necropsy, the total number of metastases were quantified and the number of metastases per mice and their localization were also reported.

Along the study, the vehicle-treated mice showed a statistically significant lower body weight than mice treated with 0.5 mg/kg of SEQ ID NO: 6—NH$_2$ (p<0.0001), 2 mg/kg of SEQ ID NO: 6—NH$_2$ (p<0.0001), 0.5 mg/kg of SEQ ID NO: 7—NH$_2$ (p=0.0006) and 2 mg/kg of SEQ ID NO: 7—NH$_2$ (p=0.0012). These differences were mainly due to the lower percentage of mice which developed metastases in the groups treated with SEQ ID NO: 6—NH$_2$ and SEQ ID NO: 7—NH$_2$ peptides.

As shown in Table 9, all PBS-treated mice developed metastases. The treatment with the 2 tested doses of SEQ ID NO: 6—NH$_2$ and the low dose of SEQ ID NO: 7—NH$_2$ caused approximately a 15% of reduction in metastases formation. Meanwhile, in the group treated with SEQ ID NO: 7—NH$_2$ 2 mg/kg only 2 of 7 mice metastasized, showing a statistically significant reduction in comparison with PBS-treated group (p=0.0048).

TABLE 9

Number and percentage of mice that formed metastases in each treatment group along the 27-week study after a single injection of RD cells in tail vein.

| Group of treatment | Presence of metastases (%) | Absence of metastases | Fisher exact test vs vehicle group |
|---|---|---|---|
| Vehicle (PBS) | 9 (100%) | 0 (0%) | |
| SEQ ID NO: 6-NH$_2$ - 0.5 mg/kg | 5 (83%) | 1 (17%) | n.s. |
| SEQ ID NO: 6-NH$_2$ - 2 mg/kg | 6 (86%) | 1 (14%) | n.s. |
| SEQ ID NO: 7-NH$_2$ - 0.5 mg/kg | 5 (83%) | 1 (17%) | n.s |
| SEQ ID NO: 7-NH$_2$ - 2 mg/kg | 2 (29%) | 5 (71%) | p = 0.0048 | n.s.: non-significant

Figure 4:
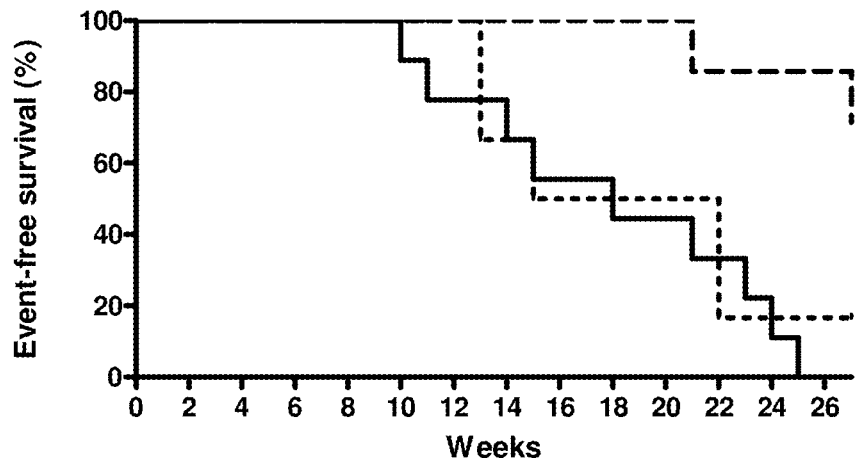
FIG. 4. Event-free survival Kaplan-Meier curves for Rhabdomyosarcoma metastatic mice treated with vehicle (PBS, continuous line, —), SEQ ID NO: 7—$NH_2$ at 0.5 mg/kg (line with dots, . . . ) or SEQ ID NO: 7—$NH_2$ at 2 mg/kg (line with dashes, - - -) along the 27-week study. The y-axis refers to the event-free survival in percentage. The x-axis refers to the weeks (in number of weeks).

The representation of event-free survival per treatment group also showed a significant difference in the group treated with SEQ ID NO: 7—NH$_2$ at a dose of 2 mg/kg when compared to the control group treated with vehicle (Log-rank p-value=0.0006). SEQ ID NO: 7—NH$_2$ at the lower dose and SEQ ID NO:6—NH$_2$ at both doses tested did not show statistically significant difference when compared with the vehicle-treated group (FIG. 4 shows the results for animals treated with PBS and SEQ ID NO: 7—NH$_2$).

Figure 5:
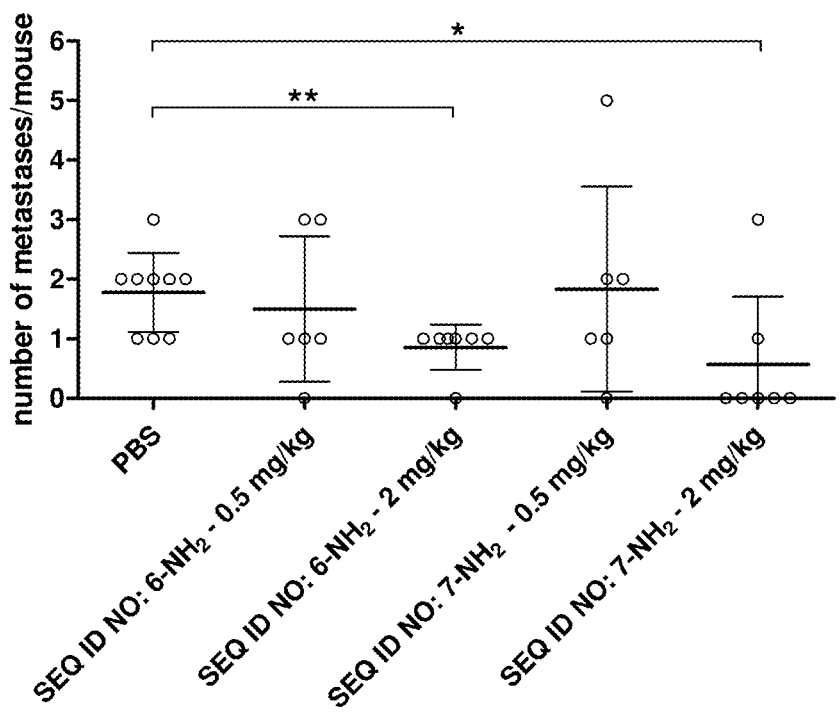
FIG. 5. Mean number of metastases formed per mice injected with RD cells in tail vein and treated with vehicle (PBS), SEQ ID NO: 6—$NH_2$ at 0.5 mg/kg and 2 mg/kg or SEQ ID NO: 7—$NH_2$ at 0.5 mg/kg and 2 mg/kg along the 27-week study. Horizontal lines represent mean ±SEM. Statistical significance: * p-value<0.05; ** p-value<0.01. The y-axis refers to the number of metastases per mouse. The x-axis refers to the treatment group and, from left to right, the different groups are vehicle (PBS), SEQ ID NO: 6—NH₂ at 0.5 mg/kg and 2 mg/kg or SEQ ID NO: 7—NH₂ at 0.5 mg/kg and 2 mg/kg.

Moreover, the evaluation of the number of metastases generated per mouse after single i.v. administration of RD cells, and after being treated s.c. 3 times per weeks with vehicle or the different treatments, indicated that SEQ ID NO: 6—NH$_2$ and SEQ ID NO: 7—NH$_2$ at 2 mg/kg statistically reduced the formation of metastases per mouse when compared with control mice treated with vehicle (PBS) (SEQ ID NO: 6—NH$_2$ 2 mg/kg, p=0.0058; SEQ ID NO: 7—NH$_2$ 2 mg/kg, p=0.0184) (FIG. 5).

The results presented above indicate that SEQ ID NO: 6—NH$_2$ or SEQ ID NO: 7—NH$_2$ at the lower dose did not show a significant effect neither in the delay of the appearance of metastases assessed as event-free survival nor in the number of mice with absence of metastases. However, the treatment with SEQ ID NO: 6—NH$_2$ and SEQ ID NO: 7—NH$_2$ at the higher dose showed to be efficacious in the reduction of the number of metastases observed at necropsy.

In relation with the localization, the metastases developed at different localizations: intestine, womb, paw, back spleen, ovary and suprarenal gland. Metastases at ovary, suprarenal gland, back and spleen were the more frequent in all treatment groups.

Example 8. Effects of the Peptide SEQ ID NO: 7—NH$_2$ on a Neuroblastoma Metastatic Mice Model SCID/Beige female mice aged 5 weeks were administered subcutaneously (s.c.) at day −1 with the first dose of treatment, this is the vehicle (PBS) or the peptide SEQ ID NO: 7-NH$_2$ at doses of 1 mg/kg and 2 mg/kg. On day 0, mice were injected intravenously (i.v.) in the tail vein with $2 \times 10^5$ BE(2)-C neuroblastoma cells. Afterwards, mice were treated s.c. three times per week (every 2-3 days) for 13 weeks with vehicle PBS (n=8) and SEQ ID NO: 7—NH$_2$ 1 mg/kg (n=9) and 2 mg/kg (n=9).

As shown in Table 10, whereas 7 of 8 mice (88%) in the PBS-treated group developed metastases, the number of mice that metastasized tended to be lower in the group treated with SEQ ID NO: 7—NH$_2$ 2 mg/kg (4 of 9 (44%), p=0.1312)

TABLE 10

Number and percentage of mice that formed metastases in each treatment group along the 13-week study after a single injection of BE(2)-C cells in tail vein.

| Group of treatment | Presence of metastases (%) | Absence of metastases | Fisher exact test vs vehicle group |
|---|---|---|---|
| Vehicle (PBS) | 7 (88%) | 1 (13%) | |
| SEQ ID NO: 7-NH$_2$ - 1 mg/kg | 7 (78%) | 2 (22%) | p = 1.0000 |
| SEQ ID NO: 7-NH$_2$ - 2 mg/kg | 4 (44%) | 5 (56%) | p = 0.1312 |

Figure 6:
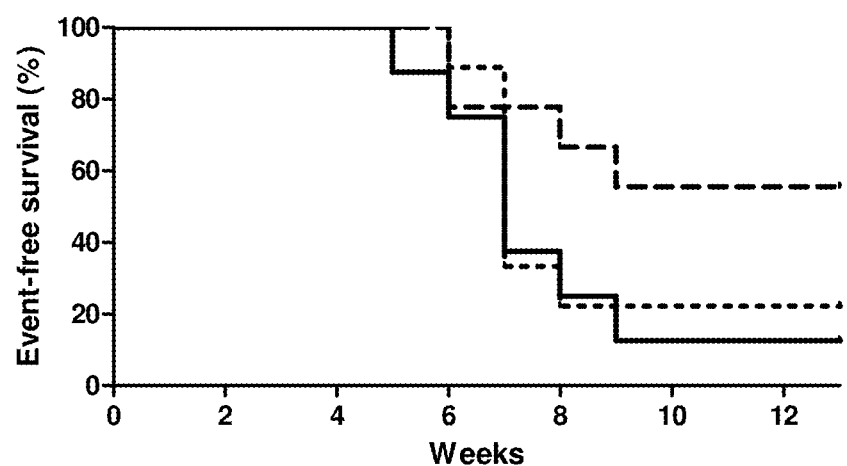
FIG. 6. Event-free survival Kaplan-Meier curves for Neuroblastoma metastatic mice treated with vehicle (PBS, continuous line, —), SEQ ID NO: 7—NH₂ at 1 mg/kg (line with dots, . . . ) or SEQ ID NO: 7—NH₂ at 2 mg/kg (line with dashes, - - -) along the 13-week study. The y-axis refers to the event-free survival in percentage. The x-axis refers to the weeks (in number of weeks).

Moreover, the event-free survival representation showed a remarkable difference between the group treated with vehicle (survival: 1 of 8 mice, 13%), the group treated with the peptide SEQ ID NO: 7—NH$_2$ at 1 mg/kg (survival: 2 of 9 (22%), Log-rank p-value=0.6294) and the group treated with the peptide at 2 mg/kg (survival: 5 of 9 (56%), Log-rank p-value=0.0658), indicating the efficacy of the peptide SEQ ID NO: 7—NH$_2$ at the highest dose (FIG. 6).

This application contains references to amino acid sequences and/or nucleic acid sequences which have been submitted concurrently herewith as the sequence listing text file entitled "15877-000402-US-NP Sequence Listing_ST25.TXT", file size 4,944 bytes kilobytes (KB), created on 2 Jun. 2025. The aforementioned sequence listing is hereby incorporated by reference in its entirety pursuant to 37 C.F.R. § 1.52 (e)(5).

The invention claimed is:

1. A peptide of general formula (I):

$$R_1\text{-}AA_1\text{-}AA_2\text{-}Arg\text{-}Asp\text{-}Ser\text{-}Ser\text{-}Asn\text{-}Ser\text{-}AA_3\text{-}Asp\text{-}Leu\text{-}Pro\text{-}Glu\text{-}AA_4\text{-}AA_5\text{-}R_2 \quad (I)$$
$$(R_1\text{-}SEQ\ ID\ NO: 11\text{-}R_2)$$

its stereoisomers, mixtures thereof and/or its pharmaceutically acceptable salts,
wherein
$AA_1$ is Pyr or bond;
$AA_2$ is Lys, Cys or bond;
$AA_3$ is Cys, Met or Cys (Cys) (Cystine);
$AA_4$ is 2,4,6-trimethylphenylalanine (Msa) or 2,4,6-trimethylphenylglycine (Msg);
$AA_5$ is Lys, Cys or bond;
$R_1$ is selected from the group consisting of H, substituted or unsubstituted non-cyclic aliphatic group, substituted or unsubstituted alicyclyl, substituted or unsubstituted heterocyclyl, substituted or unsubstituted heteroarylalkyl, substituted or unsubstituted aryl, substituted or unsubstituted aralkyl, a polymer derived from polyethylene glycol and $R_5$—CO—, wherein $R_5$ is selected from the group consisting of H, substituted or unsubstituted non-cyclic aliphatic group, substituted or unsubstituted alicyclyl, substituted or unsubstituted aryl, substituted or unsubstituted aralkyl, substituted or unsubstituted heterocyclyl and substituted or unsubstituted heteroarylalkyl;
$R_2$ is selected from the group consisting of —$NR_3R_4$, —$OR_3$ and —$SR_3$, wherein $R_3$ and $R_4$ are independently selected from the group consisting of H, substituted or unsubstituted non-cyclic aliphatic group, substituted or unsubstituted alicyclyl, substituted or unsubstituted heterocyclyl, substituted or unsubstituted heteroarylalkyl, substituted or unsubstituted aryl and substituted or unsubstituted aralkyl.

2. The peptide according to claim 1, wherein $AA_4$ is 2,4,6-trimethylphenylalanine (Msa).

3. The peptide according to claim 1, wherein $AA_2$ and $AA_5$ are independently selected from Lys or bond.

4. The peptide according to, claim 1, wherein $R_1$ is selected from the group consisting of H and $R_5$—CO—, wherein $R_5$ is selected from the group consisting of substituted or unsubstituted $C_1$-$C_{24}$ alkyl, substituted or unsubstituted $C_2$-$C_{24}$ alkenyl, substituted or unsubstituted $C_2$-$C_{24}$ alkynyl, substituted or unsubstituted $C_3$-$C_{24}$ cycloalkyl, substituted or unsubstituted $C_5$-$C_{24}$ cycloalkenyl, substituted or unsubstituted $C_8$-$C_{24}$ cycloalkynyl, substituted or unsubstituted $C_6$-$C_{30}$ aryl, substituted or unsubstituted $C_7$-$C_{24}$ aralkyl, substituted or unsubstituted heterocyclyl with 3-10 ring members, and substituted or unsubstituted heteroarylalkyl of 2 to 24 carbon atoms and 1 to 3 atoms other than carbon and an alkyl chain of 1 to 6 carbon atoms.

5. The peptide according to claim 4, wherein $R_1$ is selected from the group consisting of H, acetyl, tert-butanoyl, hexanoyl, 2-methylhexanoyl, cyclohexanecarboxyl, octanoyl, decanoyl, lauroyl, myristoyl, palmitoyl, stearoyl, oleoyl and linoleoyl.

6. The peptide according to claim 1, wherein $R_2$ is —$NR_3R_4$ or —$OR_3$, wherein $R_3$ and R4 are independently selected from the group consisting of H, substituted or unsubstituted $C_1$-$C_{24}$ alkyl, substituted or unsubstituted $C_2$-$C_{24}$ alkenyl, substituted or unsubstituted $C_2$-$C_{24}$ alkynyl, substituted or unsubstituted $C_3$-$C_{24}$ cycloalkyl, substituted or unsubstituted $C_5$-$C_{24}$ cycloalkenyl, substituted or unsubstituted $C_8$-$C_{24}$ cycloalkynyl, substituted or unsubstituted $C_6$-$C_{30}$ aryl, substituted or unsubstituted $C_7$-$C_{24}$ aralkyl, substituted or unsubstituted heterocyclyl with 3-10 ring members, and substituted or unsubstituted heteroarylalkyl of 2 to 24 carbon atoms and 1 to 3 atoms other than carbon and an alkyl chain of 1 to 6 carbon atoms.

7. The peptide according to claim 6, wherein $R_3$ and $R_4$ are independently selected from the group consisting of H, methyl, ethyl, propyl, butyl, pentyl, hexyl, octyl, decyl, dodecyl and hexadecyl.

8. A peptide dimer comprising two peptides of formula (I) according to claim 1, its stereoisomers, mixtures thereof and/or its pharmaceutically acceptable salts, wherein the peptide dimer is a disulfide-bridged peptide dimer.

9. The peptide according to claim 1, or the peptide dimer according to claim 8, which is selected from the group consisting of:

```
R₁-Arg-Asp-Ser-Ser-Asn-Ser-Cys-Asp-

Leu-Pro-Glu-Msa-R₂
(R₁-SEQ ID NO: 3-R₂),

Pyr-Arg-Asp-Ser-Ser-Asn-Ser-Cys-Asp-

Leu-Pro-Glu-Msa-R₂
(SEQ ID NO: 4-R₂)

R₁-Lys-Arg-Asp-Ser-Ser-Asn-Ser-Cys-

Asp-Leu-Pro-Glu-Msa-Lys-R₂
(R₁-SEQ ID NO: 5-R₂),

Pyr-Lys-Arg-Asp-Ser-Ser-Asn-Ser-Cys-

Asp-Leu-Pro-Glu-Msa-Lys-R₂
(SEQ ID NO: 6-R₂),

Pyr-Lys-Arg-Asp-Ser-Ser-Asn-Ser-Met-

Asp-Leu-Pro-Glu-Msa-Lys-R₂
(SEQ ID NO: 7-R₂)

(Pyr-Lys-Arg-Asp-Ser-Ser-Asn-Ser-Cys-

Asp-Leu-Pro-Glu-Msa-Lys-R₂)₂
(disulfide bridge)
[(SEQ ID NO: 6-R₂)₂ (disulfide bridge)], R₁-Lys-Arg-Asp-Ser-Ser-Asn-Ser-Met- Asp-Leu-Pro-Glu-Msa-Lys-R₂
(R₁-SEQ ID NO: 8-R₂),
  and Pyr-Lys-Arg-Asp-Ser-Ser-Asn-Ser-Cys (Cys)-Asp-Leu-Pro-Glu-Msa-Lys-R₂
(SEQ ID NO: 9-R₂).
```

10. The peptide or the peptide dimer according to claim 9, which is selected from the group consisting of:

```
Ac-Arg-Asp-Ser-Ser-Asn-Ser-Cys-Asp-

Leu-Pro-Glu-Msa-NH₂
(Ac-SEQ ID NO: 3-NH₂),

Octanoyl-Arg-Asp-Ser-Ser-Asn-Ser-Cys-

Asp-Leu-Pro-Glu-Msa-NH₂
(Octanoyl-SEQ ID NO: 3-NH₂),

Pyr-Arg-Asp-Ser-Ser-Asn-Ser-Cys-Asp-

Leu-Pro-Glu-Msa-NH₂
(SEQ ID NO: 4-NH₂),

Ac-Lys-Arg-Asp-Ser-Ser-Asn-Ser-Cys-

Asp-Leu-Pro-Glu-Msa-Lys-NH₂
(Ac-SEQ ID NO: 5-NH₂),

Octanoyl-Lys-Arg-Asp-Ser-Ser-Asn-Ser-

Cys-Asp-Leu-Pro-Glu-Msa-Lys-NH₂
(Octanoyl-SEQ ID NO: 5-NH₂),

Pyr-Lys-Arg-Asp-Ser-Ser-Asn-Ser-Cys-

Asp-Leu-Pro-Glu-Msa-Lys-NH₂
(SEQ ID NO: 6-NH₂),

Pyr-Lys-Arg-Asp-Ser-Ser-Asn-Ser-Met-

Asp-Leu-Pro-Glu-Msa-Lys-NH₂
(SEQ ID NO: 7-NH₂), (Pyr-Lys-Arg-Asp-Ser-Ser-Asn-Ser-Cys-

Asp-Leu-Pro-Glu-Msa-Lys-NH₂)₂
(disulfide bridge) [(SEQ ID NO: 6-NH₂)₂
(disulfide bridge)], Octanoyl-Lys-Arg-Asp-Ser-Ser-Asn-Ser- Met-Asp-Leu-Pro-Glu-Msa-Lys-NH₂
(Octanoyl-SEQ ID NO: 8-NH₂),
  and Pyr-Lys-Arg-Asp-Ser-Ser-Asn-Ser-Cys(Cys)-

Asp-Leu-Pro-Glu-Msa-Lys-NH₂
(SEQ ID NO: 9-NH₂).
```

11. A process for the preparation of a peptide according to claim 1, or a peptide dimer according to claim 8, its stereoisomers, mixtures thereof and/or its pharmaceutically acceptable salts, which is carried out using solid phase peptide synthesis or peptide synthesis in solution.

12. The process according to claim 11, carried out using solid phase peptide synthesis, comprising the following steps:
   a) Solid phase peptide synthesis in a polymeric support using, if needed, protecting groups;
   b) Cleaving the peptide from the polymeric support;
   c) If a cyclic peptide or a peptide dimer is to be obtained, oxidation of the peptide in solution to obtain the cyclic peptide or the peptide dimer;
   d) If needed, eliminating the protecting groups;
or alternatively,
   i) Solid phase peptide synthesis in a polymeric support using, if needed, protecting groups;
   ii) If a cyclic peptide or a peptide dimer is to be obtained, solid phase peptide cycling or dimer formation in the polymeric support;
   iii) Cleaving the peptide, the cyclic peptide or the peptide dimer from the polymeric support and, if needed, simultaneously eliminating the protecting groups;
   iv) Optionally, oxidation of the cyclic peptide in solution to obtain a peptide dimer.

13. A pharmaceutical composition which comprises a pharmaceutically effective amount of at least one peptide according to claim 1, or of at least one peptide dimer according to claim 8, or combinations thereof, its stereoisomers, mixtures thereof and/or its pharmaceutically acceptable salts.

14. The pharmaceutical composition according to claim 13, wherein the peptide or the peptide dimer is incorporated into a delivery system and/or a sustained release system selected from the group consisting of liposomes, mixed liposomes, oleosomes, niosomes, ethosomes, milliparticles, microparticles, nanoparticles and solid lipid nanoparticles, nanostructured lipid carriers, sponges, cyclodextrins, vesicles, micelles, mixed micelles of surfactants, surfactant-phospholipid mixed micelles, millispheres, microspheres, nanospheres, liposheres, millicapsules, microcapsules, nanocapsules, microemulsions and nanoemulsions.

15. The peptide according to claim 1 or the peptide dimer according to claim 8, its stereoisomers, mixtures thereof and/or its pharmaceutically acceptable salts, capable of being used as a medicament.

16. A method of treatment and/or diagnosis of cancer and/or metastasis in which ADAM-12 is overexpressed, which comprises the administration of a pharmaceutically effective amount of a peptide according to claim 1 or a peptide dimer according to claim 8, its stereoisomers, mixtures thereof and/or its pharmaceutically acceptable salts, to an individual in need thereof.

17. The method according to claim 16, wherein the cancer and/or metastasis is selected from the group consisting of neuroblastoma, sarcomas, soft tissue sarcomas, rhabdomyosarcoma, embryonal, alveolar, pleomorphic and spindle cell/sclerosing rhabdomyosarcoma, intimal sarcoma, undifferentiated spindle cell sarcoma, undifferentiated pleomorphic sarcoma, undifferentiated round cell sarcoma, undifferentiated epithelioid sarcoma, liposarcoma, atypical lipomatous tumour, malignant solitary fibrous tumour, inflammatory myofibroblastic tumour, low-grade myofibroblastic sarcoma, fibrosarcoma, adult and sclerosing epithelioid fibrosarcoma varieties, myxofibrosarcoma, low-grade fibromyxoid sarcoma, giant cell tumour of soft tissues, leiomyosarcoma, malignant *glomus* tumour, hemangioendothelioma, retiform, pseudomyogenic and epithelioid hemangioendothelioma, angiosarcoma of soft tissue, extraskeletal osteosarcoma, malignant gastrointestinal stromal tumour (GIST), malignant peripheral nerve sheath tumour, malignant Triton tumour, malignant granular cell tumour, malignant ossifying fibromyxoid tumour, stromal sarcoma, myoepithelial carcinoma, malignant phosphaturic mesenchymal tumour, synovial sarcoma, spindle cell and biphasic synovial sarcoma, epithelioid sarcoma, alveolar soft part sarcoma, clear cell sarcoma of soft tissue, extraskeletal myxoid chondrosarcoma, extraskeletal Ewing sarcoma, desmoplastic small round cell tumour, extrarenal rhabdoid tumour, perivascular epithelioid cell tumour, bone sarcomas, osteosarcoma, chondrosarcoma, Ewing sarcoma, hemangioendothelioma, angiosarcoma, fibrosarcoma, myofibrosarcoma, chordoma, adamantinoma, breast cancer, ductal, lobular, and nipple carcinoma, colon cancer, rectum cancer, anal cancer, colorectal cancer, brain cancer, glioblastoma, astrocytoma or medulloblastoma, malignant gliomas, prostate cancer, melanoma and other skin cancers, cervical cancer, uterine cancer, ovarian cancer, high-grade serous ovarian carcinoma, endometrial cancer, lymphomas, head and neck cancer, oral cancer, salivary gland carcinoma, retinoblastoma, gastrointestinal cancer, esophageal cancer, stomach cancer, pancreatic cancer, gallbladder cancer, liver cancer, hepatocellular carcinoma (HCC), kidney or renal cancer, Wilm's tumour or nephroblastoma, bladder cancer, lung cancer, small cell lung cancer, non-small cell lung cancer, non-Hodgkin's lymphoma, multiple myeloma, pituitary adenomas, squamous cell carcinoma, testicular cancer, leukemia, acute lymphocytic leukemia, chronic lymphocytic leukemia, acute myelogenous leukemia, chronic myelogenous leukemia, plasmacytoma and multiple myeloma.

\* \* \* \* \*